United States Patent
Blake

(10) Patent No.: US 8,286,837 B1
(45) Date of Patent: Oct. 16, 2012

(54) ONE TURN ACTUATED DURATION DUAL MECHANISM SPRAY DISPENSER PUMP

(76) Inventor: William Sydney Blake, Linwood, NJ (US)

(*) Notice: Subject to any disclaimer, the term of this patent is extended or adjusted under 35 U.S.C. 154(b) by 1128 days.

(21) Appl. No.: 12/218,295

(22) Filed: Jul. 14, 2008

(51) Int. Cl.
*G01F 11/06* (2006.01)

(52) U.S. Cl. ............... 222/321.5; 222/321.9; 222/321.8; 222/377; 222/340; 222/383.2

(58) Field of Classification Search .................. 222/340, 222/383.2, 377, 379, 380, 321.9, 209, 321.7, 222/321.8, 207, 321.5, 402.1, 402.2; 92/66
See application file for complete search history.

(56) References Cited

U.S. PATENT DOCUMENTS

| | | | | |
|---|---|---|---|---|
| 3,777,945 A * | 12/1973 | Nozawa et al. | ............... | 222/394 |
| 3,790,034 A * | 2/1974 | Horvath | ................... | 222/153.13 |
| 3,797,748 A * | 3/1974 | Nozawa et al. | ............... | 239/321 |
| 3,799,448 A * | 3/1974 | Nozawa et al. | ............... | 239/321 |
| 4,147,280 A * | 4/1979 | Spatz | ......................... | 222/179.5 |
| 4,155,485 A * | 5/1979 | Spatz | ......................... | 222/179.5 |
| 4,167,941 A * | 9/1979 | Capra et al. | .............. | 128/200.23 |
| 4,174,052 A * | 11/1979 | Capra et al. | ................... | 222/207 |
| 4,174,055 A * | 11/1979 | Capra et al. | ................... | 222/319 |
| 4,192,442 A * | 3/1980 | Bastian et al. | ................. | 226/127 |
| 4,387,833 A * | 6/1983 | Venus, Jr. | ......................... | 222/95 |
| 4,422,500 A * | 12/1983 | Nishizaki et al. | ........ | 165/104.12 |
| 4,423,829 A * | 1/1984 | Katz | ................................. | 222/95 |
| 4,485,943 A * | 12/1984 | Czech | ........................... | 222/256 |
| 5,392,959 A * | 2/1995 | Tubaki et al. | ................. | 222/109 |
| 5,474,215 A * | 12/1995 | Tubaki et al. | ................. | 222/385 |
| 6,708,852 B2 * | 3/2004 | Blake | ......................... | 222/321.5 |
| 7,845,521 B2 * | 12/2010 | Blake | ......................... | 222/321.5 |

* cited by examiner

*Primary Examiner* — Kevin P Shaver
*Assistant Examiner* — Robert Nichols, II
(74) *Attorney, Agent, or Firm* — Dennis H. Lambert

(57) ABSTRACT

A power assembly for dispensing product from a container includes a pump mechanism and an energy storage mechanism. The pump mechanism includes a rotatable actuating collar connected through an escapement mechanism with a drive screw with an externally threaded shaft engaged with internal threads in a piston. Rotation of the collar reciprocates the piston to store energy in the energy storage mechanism and to draw product into a pump chamber from which the product is dispensed. An actuator is connected with a stem valve to open it when the actuator is depressed, enabling the energy storage mechanism to push the piston back to its at-rest position to force product from the pump chamber and ready it for another dispensing cycle. Disengagement of the escapement mechanism when the actuator is depressed prevents rotation of the actuating collar. Different energy storage mechanisms can be interchangeably attached to the pump mechanism.

26 Claims, 17 Drawing Sheets

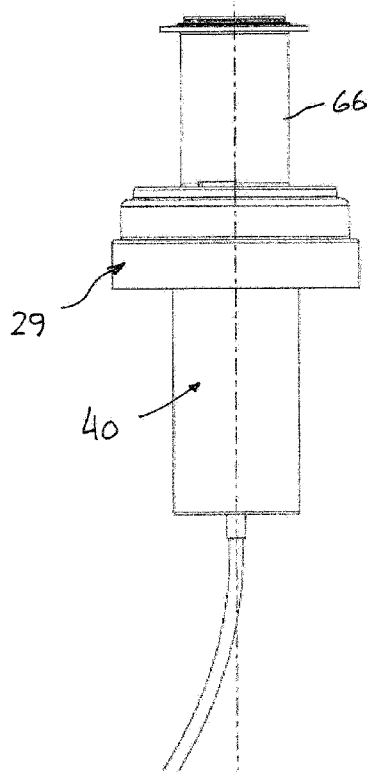 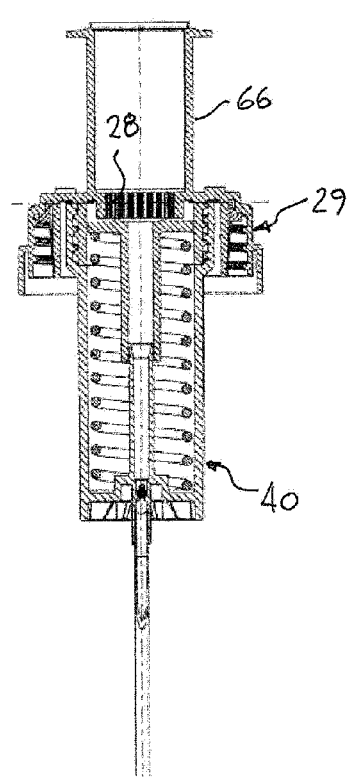 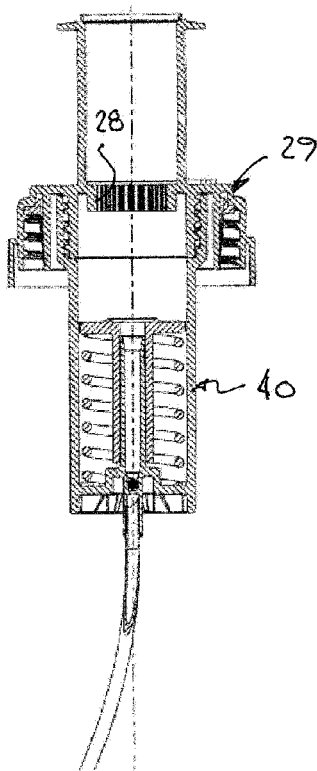
FIG. 16　　FIG. 16A　　FIG. 16B
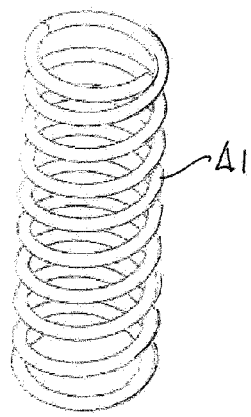 
FIG. 17　　FIG. 18

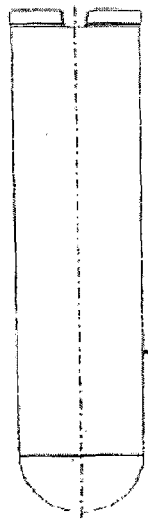
FIG. 23
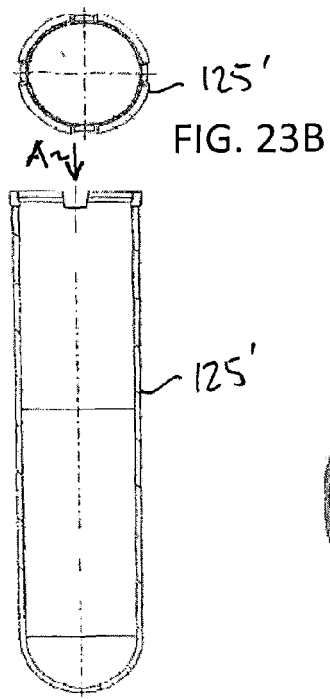
FIG. 23A
FIG. 23B
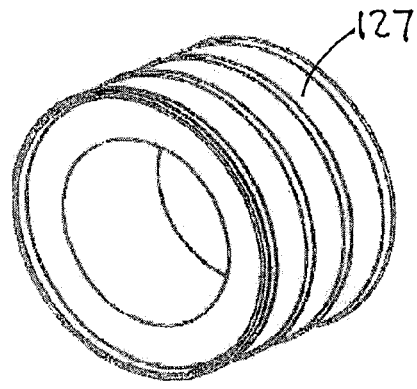
FIG. 24
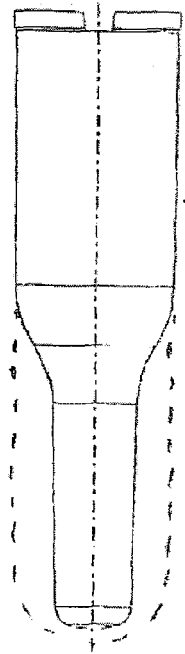
FIG. 25
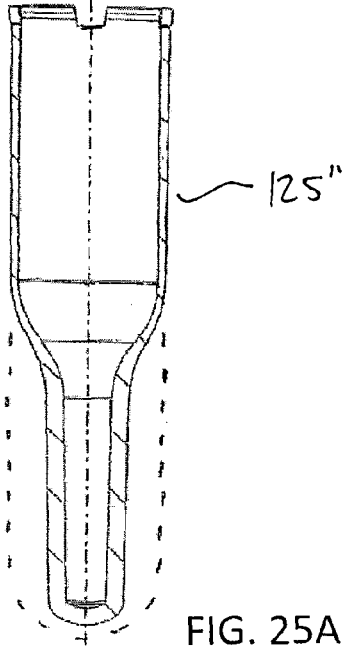
FIG. 25A

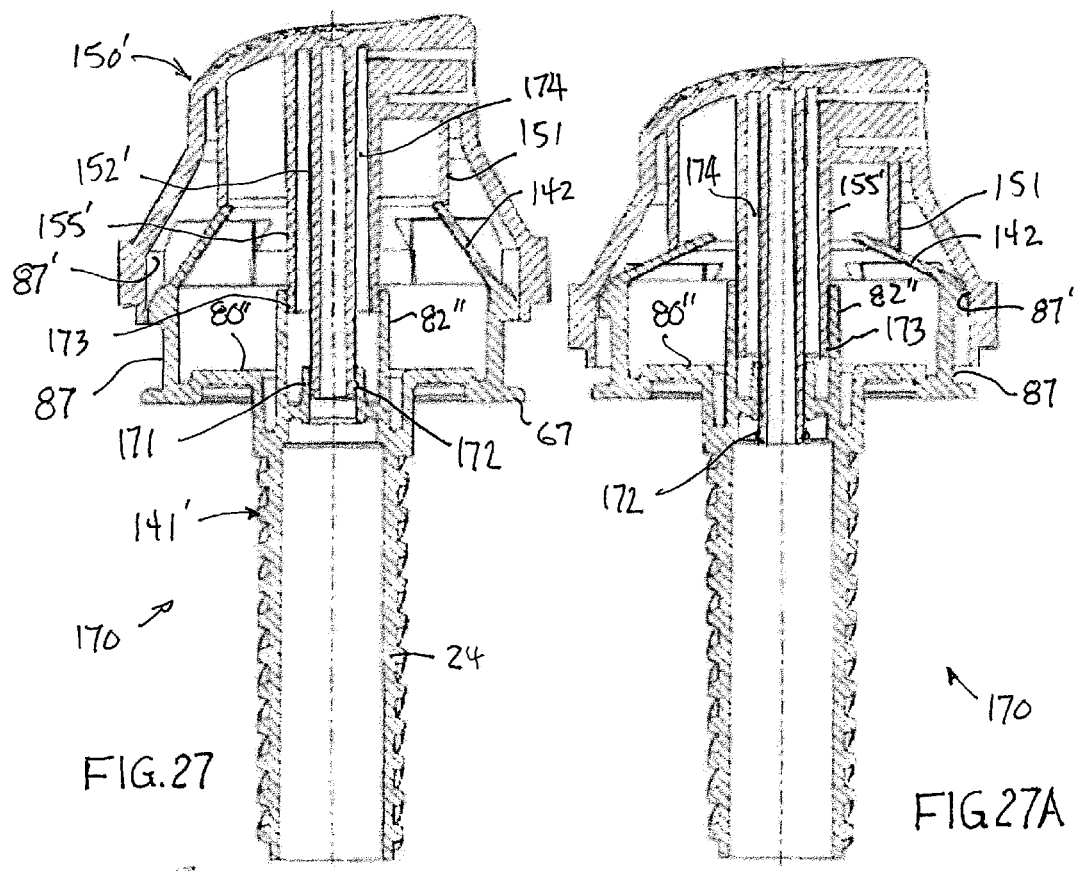
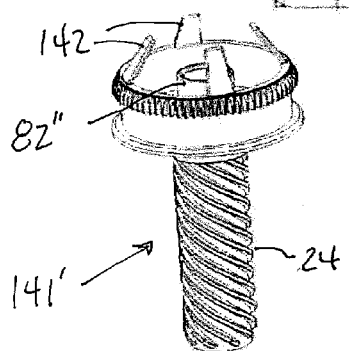
FIG. 28
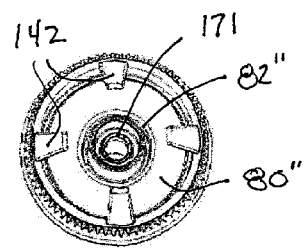
FIG. 28A

ONE TURN ACTUATED DURATION DUAL MECHANISM SPRAY DISPENSER PUMP

BACKGROUND OF THE INVENTION

1. Field of the Invention

The present invention relates to dispensers, specifically to duration spray dispensers that are energized mechanically and pressurized by a non-chemical means.

2. Description of Related Art

Both chemically driven and mechanically operated spray dispensers have been in use for many years and are still popular Due to their convenience. However, aerosol dispensers that use chemical propellants have come under increasing scrutiny and restrictions are being imposed upon them due to their adverse impact upon the environment as well as the hazards associated with handling them and related insurance issues. Also, conventional non-chemical mechanical spray dispensers are typically unfavorably compared with chemically driven aerosols because they are bulky and commonly require multiple steps in their operation, making them difficult to operate, especially by persons suffering from a disability such as arthritis. They also require a large number of parts and a large amount of material to produce them, which due to the increasing cost of energy makes them prohibitively expensive to manufacture. This, in turn, makes them too costly for use at the lower price range of consumer products, Moreover, there is a general reluctance to change from the aerosol propellant driven systems including bag in a can or pressurized piston in a can devices.

Some mechanically operated aerosol devices incorporate storage chambers that require a step in which a metered amount of product must be obtained first and then transferred into a power chamber that provides the pressure for dispensing the product over a certain duration. These types of devices are energy inefficient and degrade over shelf life and or usage, as well as being too costly due to their exotic material structure and dynamic nature for use with a range of desirable products that currently use finger pumps or chemical aerosol valves. Bag in a can devices are complex systems that do not have all the attributes of chemical aerosol delivery.

By way of example, U.S. Pat. Nos. 4,387,833 and 4,423,829 exhibit some of the above shortcomings.

U.S. Pat. No. 4,147,280 A to Spatz requires dual separate helixes and a cap for unusual manipulation to deliver product as a spray.

U.S. Pat. No. 4,167,041 A to Capra et. al. requires a storage chamber.

U.S. Pat. No. 4,174,052 A to Capra et. al. requires a storage chamber.

U.S. Pat. No. 4,174,055 A to Capra et. al. requires a storage chamber.

U.S. Pat. No. 4,222,500 A to Capra et. al. requires a storage chamber.

U.S. Pat. No. 4,872,595 A to Hammet et. al. requires a storage chamber.

U.S. Pat. No. 5,183,185 A to Hutcheson et. al. requires a storage chamber.

U.S. Pat. No. 6,708,852 B2 to Blake requires a storage chamber and multiple actions to set up.

Other patents for reference are U.S. Pat. No. 4,423,829 and U.S. Pat. No. 4,387,833 that may be of interest. All have drawbacks in expense for commercial acceptance and feasibility if mass produced at high levels in existing market applications.

Despite the efforts of such devices as shown in the forgoing patents, there remains a need for a more convenient to use, less expensive, and compact mechanically energized duration spray mechanism that performs to dispense product comparably to the chemically energized dispensers in common use. Specifically, it would be desirable to have a one turn actuated duration spray pump delivery system that is free of the faults with conventional chemical and mechanically energized aerosol dispensers.

SUMMARY OF THE INVENTION

It is an object of this invention to provide a duration spray dispenser that does not rely upon chemical propellants for its operation.

It is another object of the present invention to eliminate the need for the charging chamber technology used in conventional mechanically operated aerosol dispensers and to reduce the multiple steps involved with operating such delivery systems and to provide a mechanically operated system that is close in convenience to chemically energized dispenser systems.

It is another object of the present invention to make the size of the system closer to that of finger and trigger pumps and to create a competitive edge.

A further object of the invention is to provide a mechanically energized spray dispenser that produces a duration spray without requiring multiple strokes.

It is another object of the present invention to provide a mechanically energized operating system for spray dispensers that enables a duration spray to be obtained without requiring multiple operating steps and that enables such dispensers to have appealing neck finishes, including for products that currently utilize finger pumps.

It is another object of the present invention to provide a mechanically operated spray dispenser that has a number of parts comparable to the number of parts in single stroke pumps and that provides longer duration sprays than conventional mechanically energized dispensers.

It is another further object to provide a duration spray dispenser that is mechanically energized by a single turn of an actuator to pressurize product and ready it for dispensing, wherein different power sources may be used with the one-turn actuator to exert pressure on and dispense the product.

It is another object of the present invention to improve and present embodiments with commercial appeal that will provide additional means that are within the scope of applicant's copending application Ser. No. 11/702,734, filed Feb. 6, 2007.

It is yet another object of the present invention to provide a common actuating pump assembly that can employ various energy storage means such as springs, gases or elastics to exert pressure on product to be dispensed.

Additional objects, advantages and novel features of the invention will be set forth in part in the description that follows and in part will become apparent to those skilled in the art upon examination of the following, or may be learned by practice of the invention.

The objects and advantages may be realized and attained by means of the instrumentalities and in combinations particularly pointed out in the appended claims.

To achieve the foregoing and other objects, and in accordance with the purposes of the present invention as broadly described herein, different embodiments of the mechanism of the invention are disclosed. The new mechanisms eliminate several functions that are necessary in conventional prior art systems, i.e. having to make several turns in two different directions, one to fill a charging chamber and the other to transfer the chamber volume to an elastic storage reservoir before spraying can be initiated through a conventional valve.

More particularly, the present invention comprises a power assembly that can be attached to a container of product to obtain a duration discharge of the product, wherein the power assembly comprises a pump mechanism and an energy storage means. The pump mechanism includes a rotatable actuating collar connected through an escapement mechanism with a drive screw that has an externally threaded shaft engaged with internal threads in a piston. When the actuating collar is rotated the piston is caused to reciprocate from a first, at-rest position to a second position to draw product from the container and into a pump chamber or reservoir from which the product can be subsequently dispensed, and to store energy in the energy storage means. The actuating collar can be rotated through a full turn to draw a full charge of the product into the pump chamber, or it can be rotated through less than a full turn. A discharge valve or stem valve normally blocks flow of product from the pump chamber, and an actuator is connected with the stem valve to open it when the actuator is depressed. Opening of the stem valve enables the pressurized product to be dispensed from the pump chamber, which enables the energy storage means to push the piston back to its at-rest position to ready it for another dispensing cycle. Rotation of the actuating collar is prevented during return movement of the piston because depression of the actuator also causes the escapement mechanism to disengage the actuating collar from the drive screw, enabling the drive screw to rotate without causing rotation of the actuating collar.

The same pump mechanism can be used with a variety of different energy storage means. In one form of the invention, the energy storage means comprises a spring, and in another form it comprises a pneumatic pressure chamber. The energy storage means could comprise an elastic mechanism. Preferably, the energy storage means is pre-stressed or pre-compressed when the piston is in its at-rest position so that adequate pressure is exerted on the product in the pump chamber to obtain a suitable discharge of the product when the piston is at or near its at-rest position.

The mechanically operated mechanisms of the present invention enable a consumer to employ a single turn of 360 degrees on an actuating collar, and by pressing down on the spray actuator a duration discharge of the product to be sprayed or dispensed can be obtained. Since these new mechanisms are able to be used in much smaller neck finishes, the piston-to-cylinder diameters allow for easier actuation with much less force. These forces are comprised of only the friction that is encountered at the interface of the thread-to-helix combinations and between the piston and cylinder wall as the piston moves along its predetermined path via guide ribs that prevent back-off during its operative motion. In the mechanism of the invention there is no need to control "spin back" that results from the driving force of the energy storage devices such as springs, pneumatic chambers, or elastic fitments that create the forces that exert pressure on the product to be dispensed. These new mechanisms can be used with standard spray actuators or actuators as depicted in U.S. Pat. Nos. 6,609,666 B1 and 6,543,703 B2, for example.

Other features and advantages of the invention will become clear from the following detailed description and drawings of particular embodiments of the invention.

BRIEF DESCRIPTION OF THE DRAWINGS

The accompanying drawings, which are incorporated in and form a part of the specification, illustrate some preferred embodiments of the present invention, and together with the description, will serve to explain the principles of the present invention.

In the Drawings:

FIG. 1 is a side view in elevation of the dispenser of the invention, shown on a container without the over cap.

FIG. 2 is an enlarged longitudinal sectional view of the first preferred embodiment of the invention shown in FIG. 1, wherein the energy storage means comprises a spring, with the mechanism shown in the shipping position with the spring in its relaxed or uncompressed state.

FIG. 3 is a further enlarged fragmentary view in section of the actuator and spring assemblies, taken along line 3-3 in FIG. 2.

FIG. 4 is a transverse sectional view taken along line 4-4 in FIG. 2.

FIG. 5 is a transverse sectional view taken along line 5-5 in FIG. 2.

FIG. 6 is a fragmentary sectional view similar to FIG. 3 but on a reduced scale, showing the power assembly without the container, dip tube and over cap and in the primed or loaded position with the spring compressed.

FIG. 7 is an exploded view of the power assembly of FIGS. 2 and 3, shown with portions in section.

FIG. 8 is a side view in elevation of the pump mechanism of FIGS. 1 and 2, shown without the spring mechanism.

FIG. 8A is a longitudinal sectional view of the pump mechanism of FIG. 8, shown in the at rest position.

FIG. 8B is a longitudinal sectional view of the mechanism of FIGS. 8 and 8A, shown in the primed and loaded position.

FIG. 9A is an isometric view of the cap cylinder used in the mechanism of FIGS. 1-8B, and with reference to FIG. 2, looking toward the top end of the cap cylinder.

FIG. 9B is an isometric view of the cap cylinder of FIG. 9A, looking toward the bottom end of the cap cylinder.

FIG. 10A is an isometric view of the actuating collar, looking toward the top of the collar.

FIG. 10B is an isometric view of the actuating collar of FIG. 10A, looking toward the bottom of the collar.

FIG. 11A is an isometric view of the actuator used in the actuating assembly, looking toward the top of the actuator.

FIG. 11B is an isometric view of the actuator of FIG. 11A, looking toward the bottom of the actuator.

FIG. 12A is an isometric view of a fitment with a driving gear and a multiple start helix shaft with multiple flow channels, as used in the actuating assembly of FIG. 2, and with reference to FIG. 2, looking toward the top end of the fitment.

FIG. 12B is an isometric view of the fitment of FIG. 12A, looking slightly toward the bottom end of the fitment.

FIG. 13 is a greatly enlarged fragmentary top perspective view of the spring valve retainer used in the actuating assembly.

FIG. 14 is an enlarged top isometric view of the stem valve used in the actuating assembly.

FIG. 14A is a greatly enlarged fragmentary isometric view of the circled area in FIG. 14.

FIG. 15A is an enlarged isometric view of the piston used in the mechanism of FIGS. 1-8B, and with reference to FIG. 2, looking toward the bottom end of the piston.

FIG. 15B is an isometric view of the piston of FIG. 15A, looking toward the top end of the piston.

FIG. 16 is a side view in elevation of the spring assembly used in the mechanism of FIGS. 2 and 3, with cap cylinder and dip tube in position for use with the actuating assembly shown in FIGS. 2-8B.

FIG. 16A is a longitudinal sectional view of the spring assembly of FIG. 16, shown at rest with the spring uncompressed.

FIG. 16B is a longitudinal sectional view of the spring assembly of FIG. 16, shown in the primed and loaded position with the spring compressed.

FIG. 17 is an enlarged isometric view of the power spring used in the mechanism of FIG. 2.

FIG. 18 is an enlarged isometric view of the upper actuator spring used in the mechanism of FIG. 2.

FIG. 23 is a side view in elevation of the pressure vessel used in the embodiment of FIG. 22, wherein the pressure vessel is pre-formed.

FIG. 23A is a longitudinal sectional view of the pressure vessel of FIG. 23.

FIG. 23B is an end view of the pressure vessel of FIG. 23A, looking in the direction of the arrow A.

FIG. 24 is a greatly enlarged isometric view of the pneumatic power chamber plunger as used in the embodiment of FIG. 19.

FIG. 25 is a side view in elevation of a second form of pre-formed pressure vessel for use in the mechanism of FIG. 21.

FIG. 25A is a longitudinal sectional view of the pressure vessel of FIG. 25.

FIG. 27 is a longitudinal sectional view similar to FIG. 26 of a further modified actuator, drive gear and spring valve retainer, shown in the at-rest closed position and with the MBU omitted.

FIG. 27A is a longitudinal sectional view of the actuator, drive gear and spring valve retainer of FIG. 27, shown in the depressed opened position for dispensing product.

FIG. 28 is a top isometric view of the modified drive gear and spring valve retainer of FIGS. 27 and 27A.

FIG. 28A is a top end view of the spring valve retainer of FIG. 27.

DETAILED DESCRIPTION OF THE PREFERRED EMBODIMENTS

A first preferred embodiment of the invention is shown in FIGS. 1-18. In this form of the invention, a power assembly 10 comprising a pump mechanism 20 and spring mechanism 40 is mounted to a container C for dispensing product (not shown) from the container.

Figure 1:
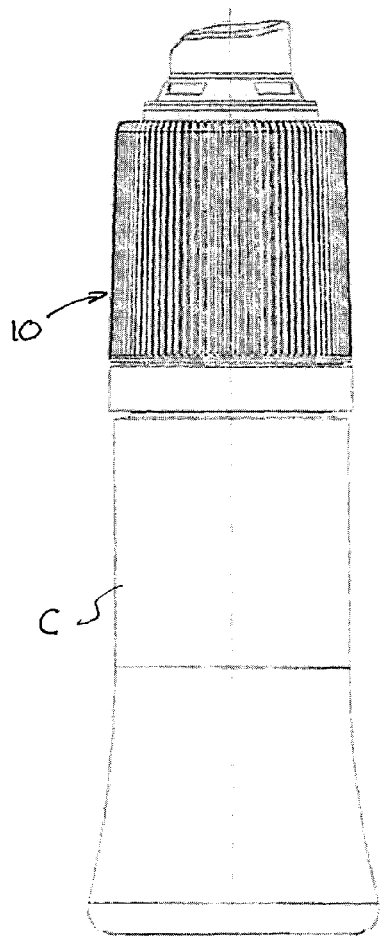
Figure 2:
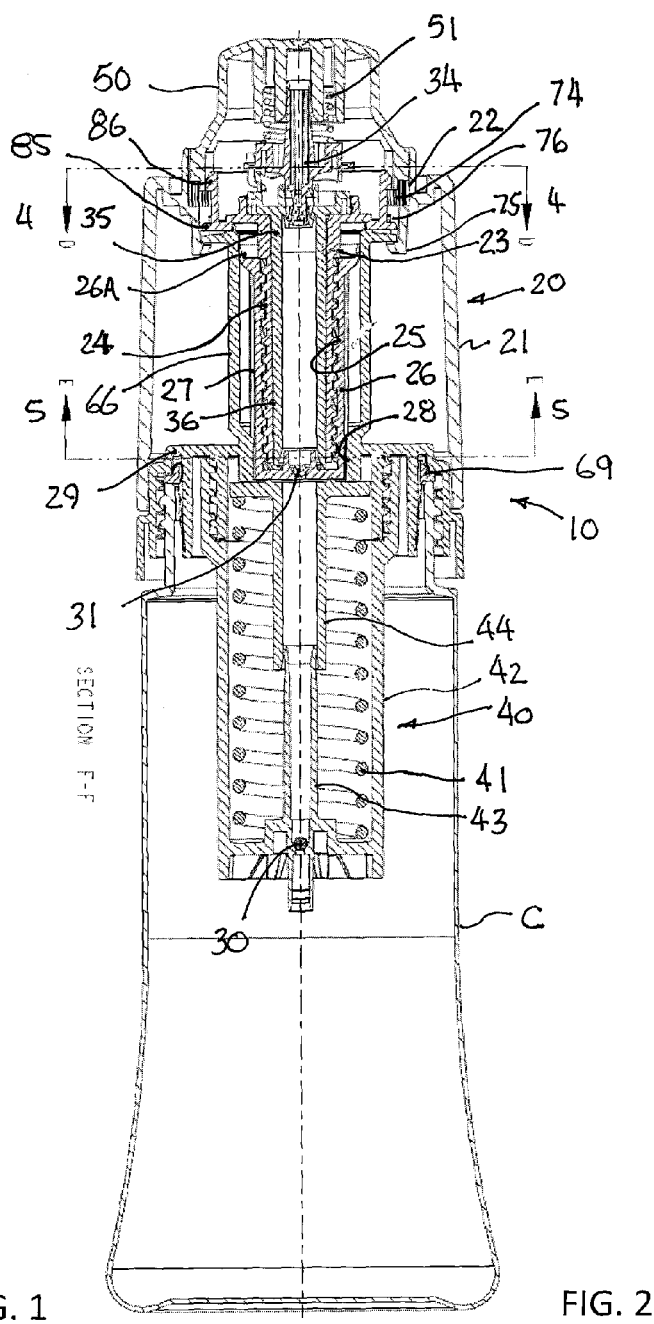
Figure 3:
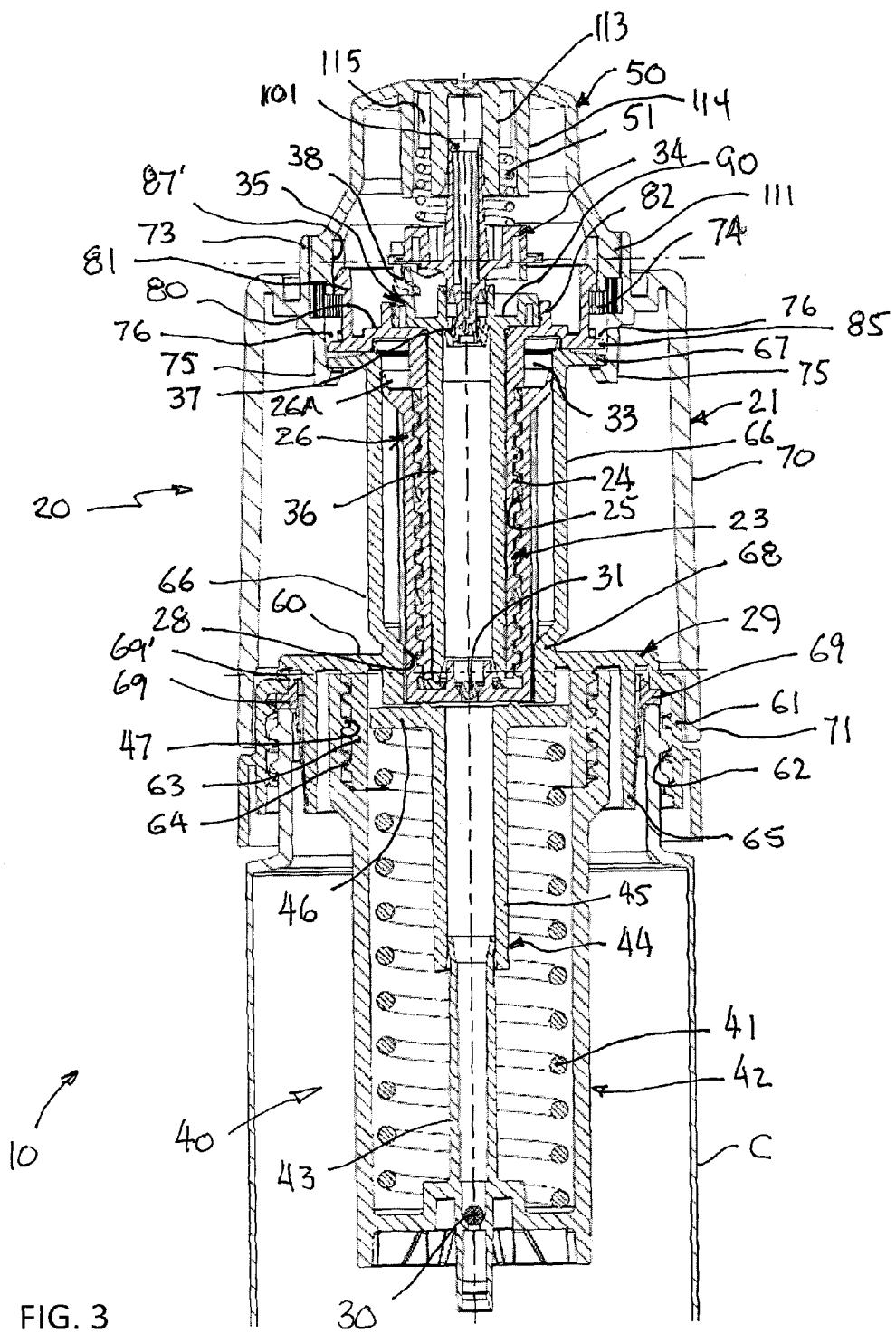
Figure 4:
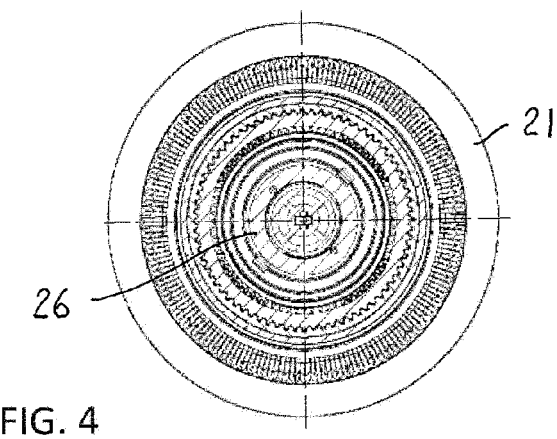
Figure 5:
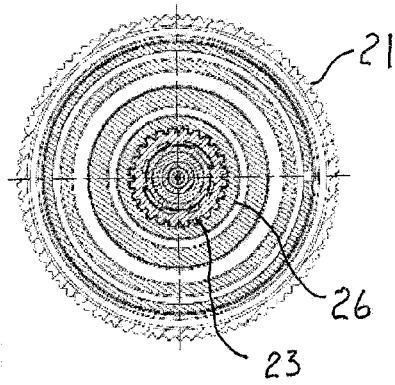
Figure 6:
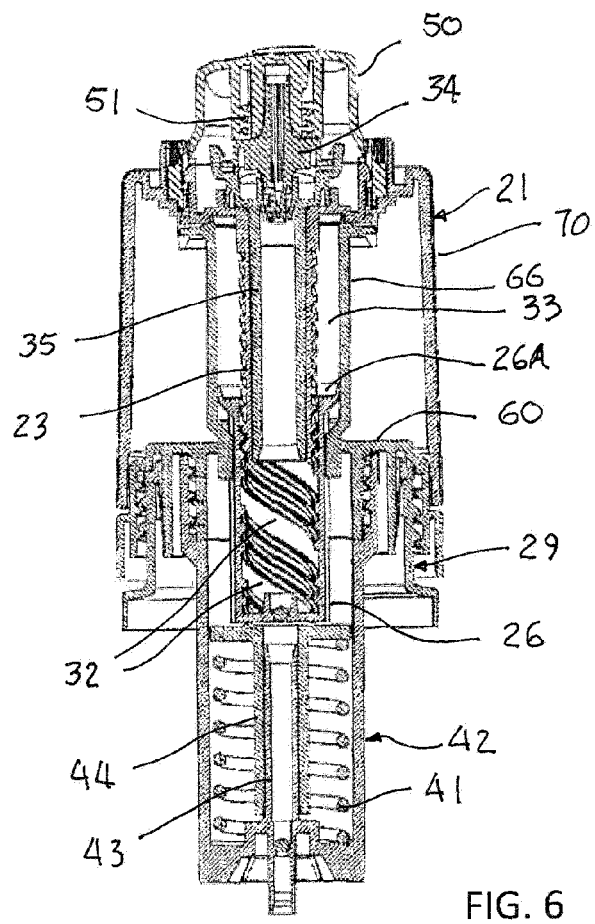
Figure 7:
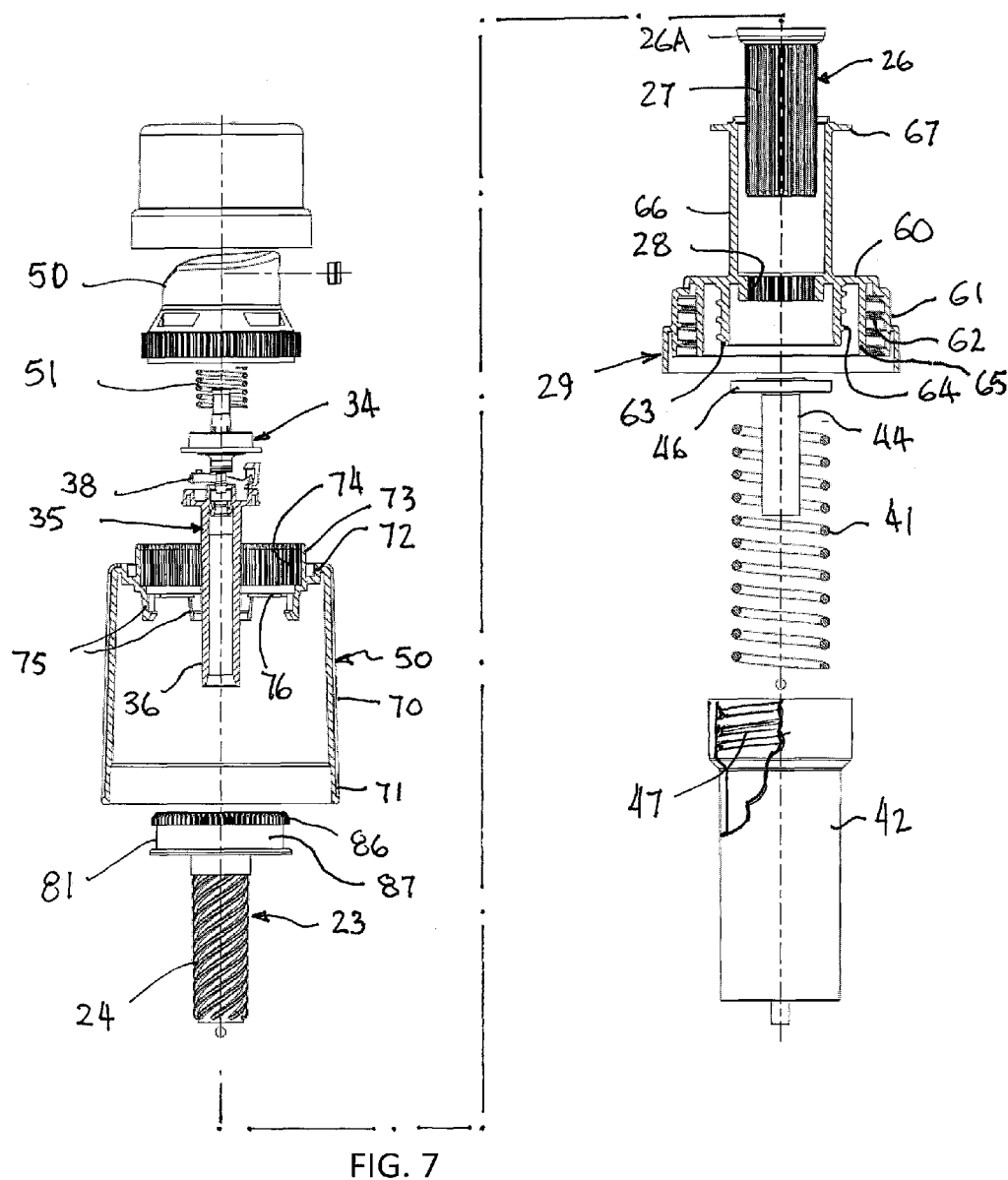
Figure 8:
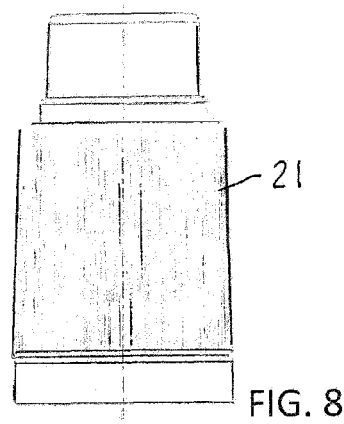
Figure 8A:
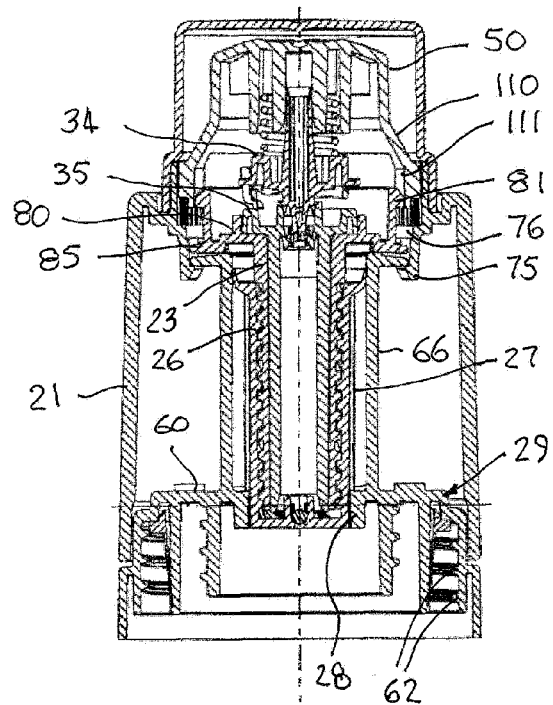
Figure 8B:
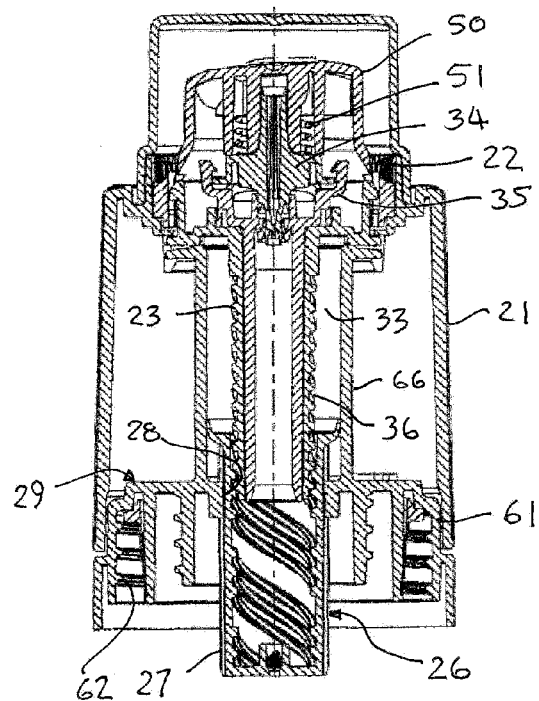
Figure 9A:
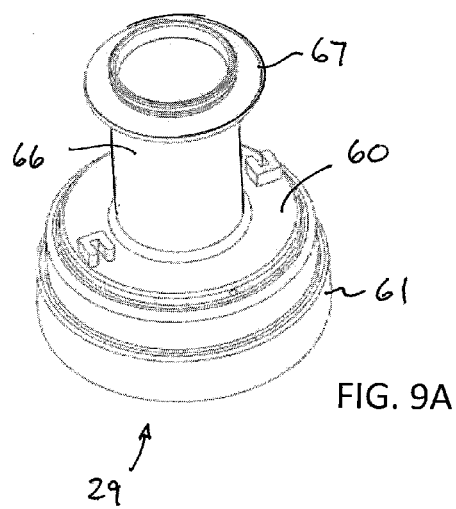
Figure 9B:
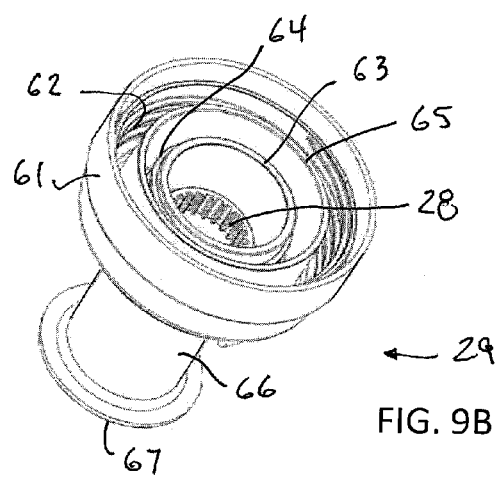
Figure 10A:
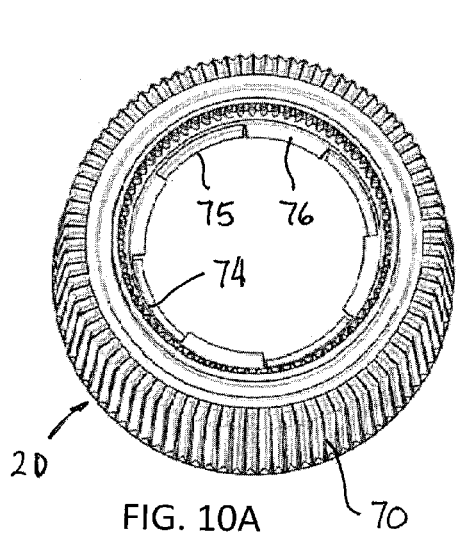
Figure 10B:
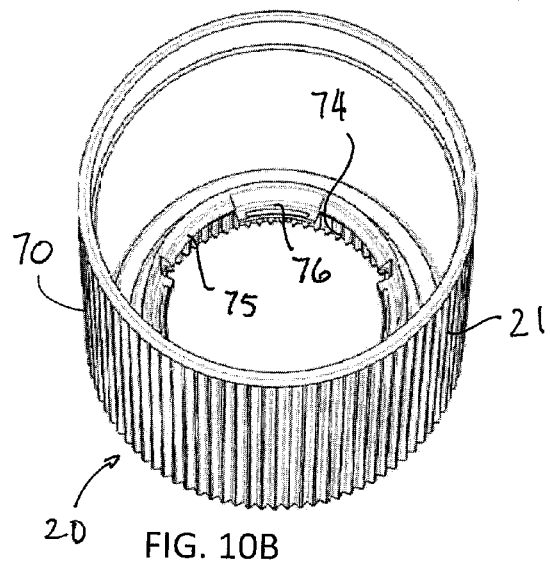

As seen best in FIGS. 1-7B, 9A and 9B, the pump mechanism 20 comprises a rotatable actuating collar 21 connected through an escapement mechanism 22 with a drive screw 23 that has an externally threaded tubular shaft 24 engaged with internal threads 25 in a hollow tube-shaped piston 26 having a sliding seal 26A on its upper end. Axial splines 27 on the outer surface of the piston are engaged with mating axial splines 28 in a cap cylinder 29 mounted on the open upper end of a container C. The splines prevent rotation of the piston so that when the drive screw is rotated by the actuating collar through a full turn the piston is caused to reciprocate from a first, at-rest position as seen in FIG. 3 to a second, primed position as seen in FIG. 6. This movement of the piston compresses a spring 41 in the spring mechanism 40 and simultaneously draws product from the container C past a first one-way ball check valve 30 in the bottom end of spring housing 42 and into guide tube 43 and spring follower 44. A second one-way ball check valve 31 in the bottom end of the piston 26 enables flow from the spring follower into the hollow piston and through flow channels 32 defined between the piston and threaded shaft into an annular pump chamber or reservoir 33 defined between the drive screw and the cap cylinder. The compressed spring 41 biases the piston back toward its at-rest position, pressurizing the product in the pump chamber 33.

A stem valve 34 is mounted for limited reciprocal movement on a stem valve retainer 35 that has an elongate hollow tail piece 36 extended coaxially in the upper end of the shaft 24. The stem valve seats against a valve seat 37 at the upper end of the tail piece and is normally biased upwardly to a closed position by leaf springs 38, 39 on the stem valve retainer, and is moved downwardly to an open position by depressing an actuator 50 when it is desired to dispense product. The interior of the tail piece 36 is in fluid communication with the interior of the piston, which in turn is in fluid communication with the pump chamber 33 via the flow channels 32. When the stem valve is opened, the spring 41 is able to push the piston upward in the pump chamber or reservoir to force the product from the chamber and expel it through the stem valve, actuator and MBU. When the actuator 50 is released following a dispensing cycle, it is biased upwardly to its at-rest position by an actuator spring 51.

Rotation of the actuating collar 21 and actuator 50 is prevented during return movement of the piston because depression of the actuator also causes the escapement mechanism 22 to disengage the actuating collar from the drive screw, enabling the drive screw to rotate without causing rotation of the actuating collar as the piston moves back up under the influence of the spring 41.

The spring mechanism 40 in this form of the invention comprises the spring housing 42, which is threaded at its upper end to the cap cylinder and depends therefrom, spring 41, guide tube 43 extending upwardly in the housing from the bottom end thereof, and spring follower 44 having a tubular tailpiece 45 telescopically engaged over the guide tube and an annular flange 46 engaged between the upper end of the spring and the lower end of the piston 26. As the piston is caused to move downwardly upon rotation of the actuating collar and drive screw, it extends into the spring housing to compress the spring 41. The guide tube 43 extending upwardly into the housing from the bottom end thereof and coaxially into the tailpiece 45 of the spring follower guides the spring follower during its reciprocating movement in the housing.

Further details of the pump mechanism 20 and spring mechanism 40 may be seen with particular reference to FIGS. 3-17.

Both the pump mechanism and the spring mechanism are carried by cap cylinder 29, seen best in FIGS. 3, 7, 9A and 9B. The cap cylinder forms a part of the pump mechanism and comprises a transverse annular wall 60 with an outer cylindrical wall 61 depending from its periphery. The outer wall has internal threads 62 that engage with external threads on the upper end of the container to secure the cap cylinder to the container. An inner cylindrical wall 63 depends from transverse wall 60 in radially inwardly spaced relation to outer wall 61 and has external threads 64 engaged with internal threads 47 in the upper end of spring housing 42 to hold the spring mechanism 40 to the cap cylinder. An intermediate cylindrical wall 65 spaced between the inner and outer walls extends into the space between the threaded upper end of the spring housing and the upper end of the container. An elongate cylindrical extension 66 projects upwardly from the center of the transverse wall 60 and defines a pump cylinder having a radially outwardly directed flange 67 on its upper end. The bottom end of the pump cylinder has a reduced diameter at 68 and extends a short distance through the annular wall 60. The cap cylinder splines 28 are formed on the inner surface of the reduced diameter portion 68. A vent fitment 69 is positioned between the walls 61 and 65 just beneath transverse wall 60 and normally seals the cap cylinder to the top of the container. Vent opening 69' in the cap cylinder adjacent the vent fitment permits venting of the container as product is depleted.

Actuating collar 21 comprises an elongate cylindrical side wall 70 having a lower end 71 telescopically received over the outer wall 61 of the cap cylinder for relative rotation therebetween, and a reduced diameter upper end 72 with a short cylindrical wall 73 having gear teeth 74 extending around its inner surface. Detent latches 75 extend downwardly from the bottom of wall 73 and engage under the flange 67 on the cap cylinder to hold the actuating collar to the cap cylinder, and radially inwardly projecting retention ledges 76 are formed on the bottom of wall 73 in upwardly spaced relation to the detent latches 75. In the specific example shown, there are four detent latches 75 equally spaced around the circumference of wall 73, and four equally spaced detent ledges 76 positioned so that they are in alignment with the gaps between the spaced latches 75. When the parts are being snapped together during assembly, this spacing of the detents enables flexing of the latches 75 to facilitate assembly. It also facilitates molding of the actuating collar.

Drive screw 23 has a transverse annular wall 80 on the upper end of shaft 24 that overlies and closes the upper end of pump chamber 33. A first cylindrical wall 81 extends upwardly from the outer periphery of the wall 80, and a second cylindrical wall 82 extends upwardly from the wall 80 approximately midway between the first wall and the opening into the top of shaft 24. A stem valve retaining groove 83 is formed in the inner surface of wall 82 near the bottom thereof. Multiple-start helix threads 84 on the outside of shaft 24 engage with the threads 25 in the piston 26, which are also multiple-start helix threads, whereby the threads on the drive screw and in the piston can engage in multiple start positions. A radially outwardly directed retaining ring 85 on the outer periphery of the wall 80 at the bottom of wall 81 is engaged between the flange 67 on the upper end of pump cylinder 66 and the detent ledges 76 on the actuating collar to enable relative rotation between the drive screw and cap cylinder but hold the drive screw against axial displacement and retain it in assembled relationship with the other components of the pump mechanism. Drive screw gear teeth 86 are formed on the upper outer surface of wall 81, and a first relief area 87 is defined between the gear teeth and the retaining ring 85. This relief area forms a part of the escapement mechanism 22, as described more fully hereinafter.

Stem valve retainer 35 has an annular flange 90 on the upper end of tail piece 36, and a cylindrical outer wall 91 on the periphery of the flange, with a radially outwardly projecting retaining ring 92 on the bottom outer surface of the wall 91. The flange 90 overlies the inner marginal portion of annular wall 80 on the drive screw, and the retaining ring 92 on wall 91 is engaged in the groove 83 in the wall 82 of the drive screw to secure the stem valve retainer to the drive screw. In addition to the leaf springs 38, 39, which are diametrically opposed, there are two diametrically opposed retaining hooks 93 and 94 formed on top of the wall 91 circumferentially offset 90° from the leaf springs.

Figures 13, 14:
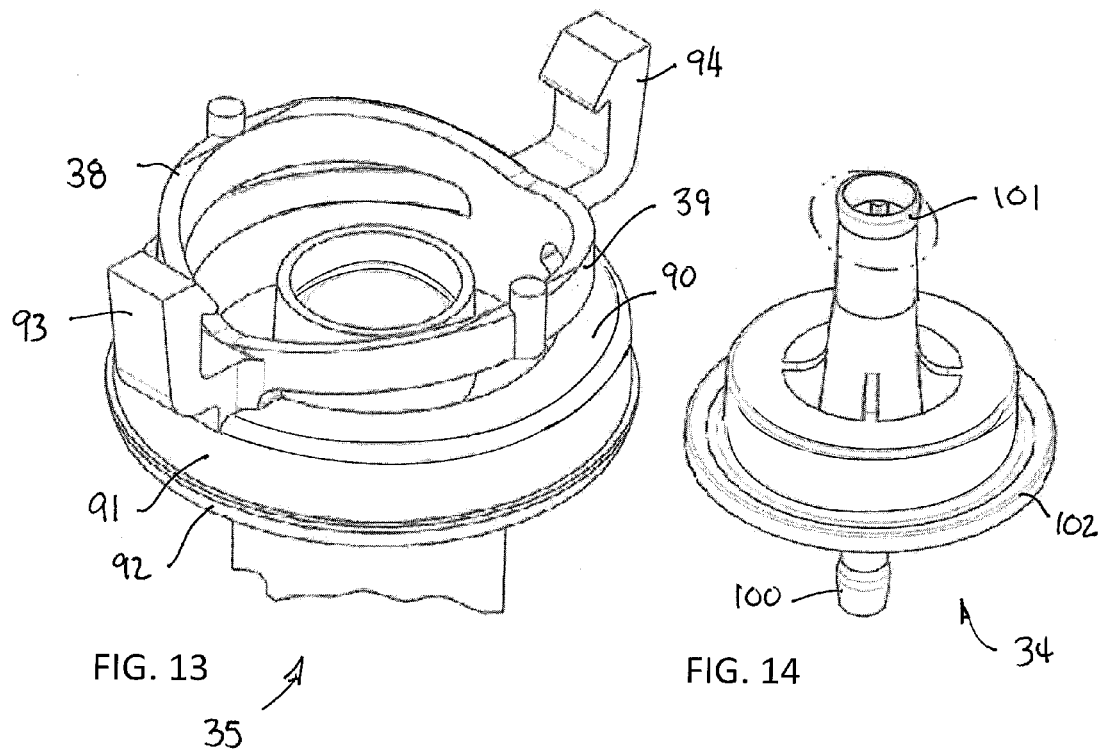
Figures 14A, 15A, 15B:
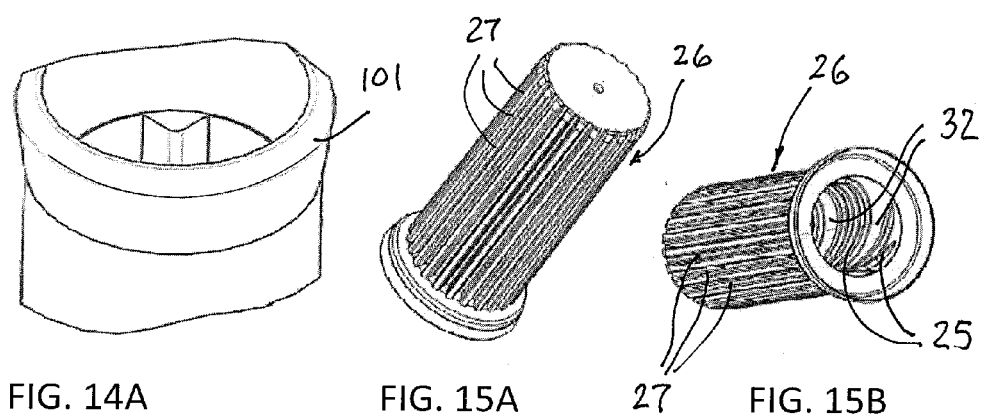

The stem valve 34, as seen best in FIGS. 3, 14 and 14A, has a valve member 100 on its lower end that is adapted to close upwardly against valve seat 37 in the stem valve retainer, and an upper tubular extension extending into the actuator and having an outwardly flared seal 101 on its upper end. A circumferential flange 102 around the outside of the stem valve is engaged beneath the retaining hooks 93 and 94 on the stem valve retainer to hold the stem valve to the stem valve retainer.

Figure 11A:
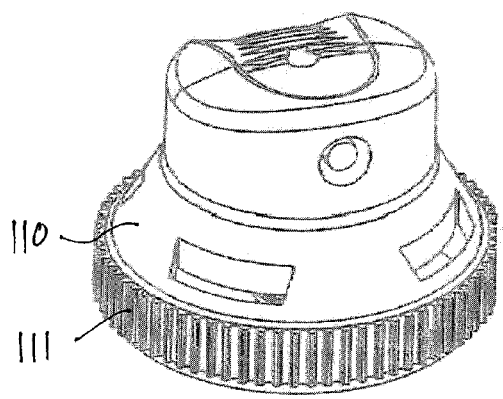
Figure 11B:
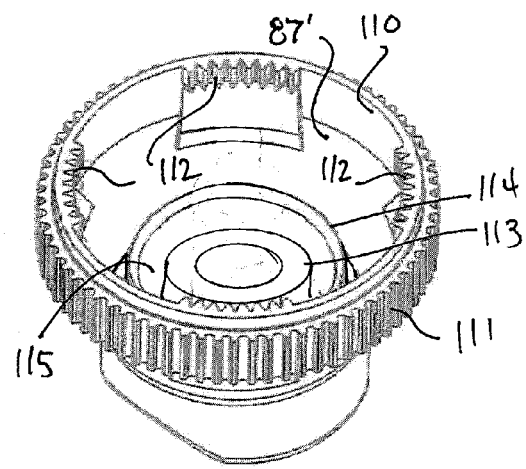
Figure 12A:
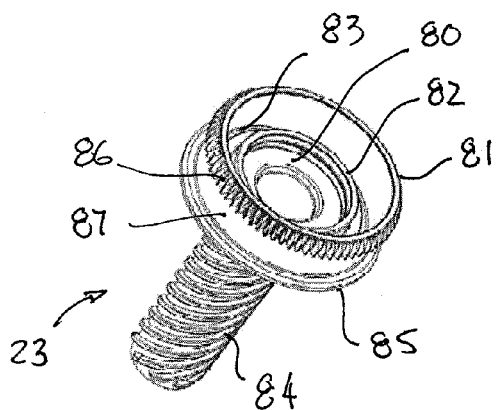
Figure 12B:
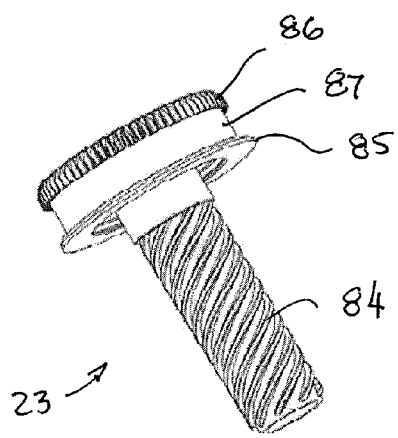

The actuator 50, as seen best in FIGS. 3, 11A and 11B, has a depending outer wall 110 with first gear teeth 111 around its lower outer surface and spaced segments of second gear teeth 112 around its inner surface. The first gear teeth 111 are adapted to mesh with the gear teeth 74 in the actuating collar 21 and the second gear teeth 112 are adapted to mesh with the drive screw gear teeth 86 on the drive screw 23 when the actuator is in its upper, at-rest position as shown in FIG. 3. A second relief area 87' is defined on the inside of wall 110 just above the teeth 112. When the actuator is depressed to open the stem valve, the first gear teeth 112 on its inner surface move into the relief area 87 on the drive screw and the drive screw gear teeth 86 on the drive screw move into the relief area 87' in the actuator, thereby disengaging the drive screw from the actuator and actuating collar so that the drive screw can rotate independently of the actuator and actuating collar. The dimensional relationship between the stem valve, the actuator and the various gear teeth is such that the gear teeth become disengaged before the stem valve opens upon depressing the actuator. A pair of closely spaced interior cylindrical walls 113, 114 depend from the top of the actuator and define a spring pocket 115 in which the actuator return spring 51 is seated.

Figure 19:
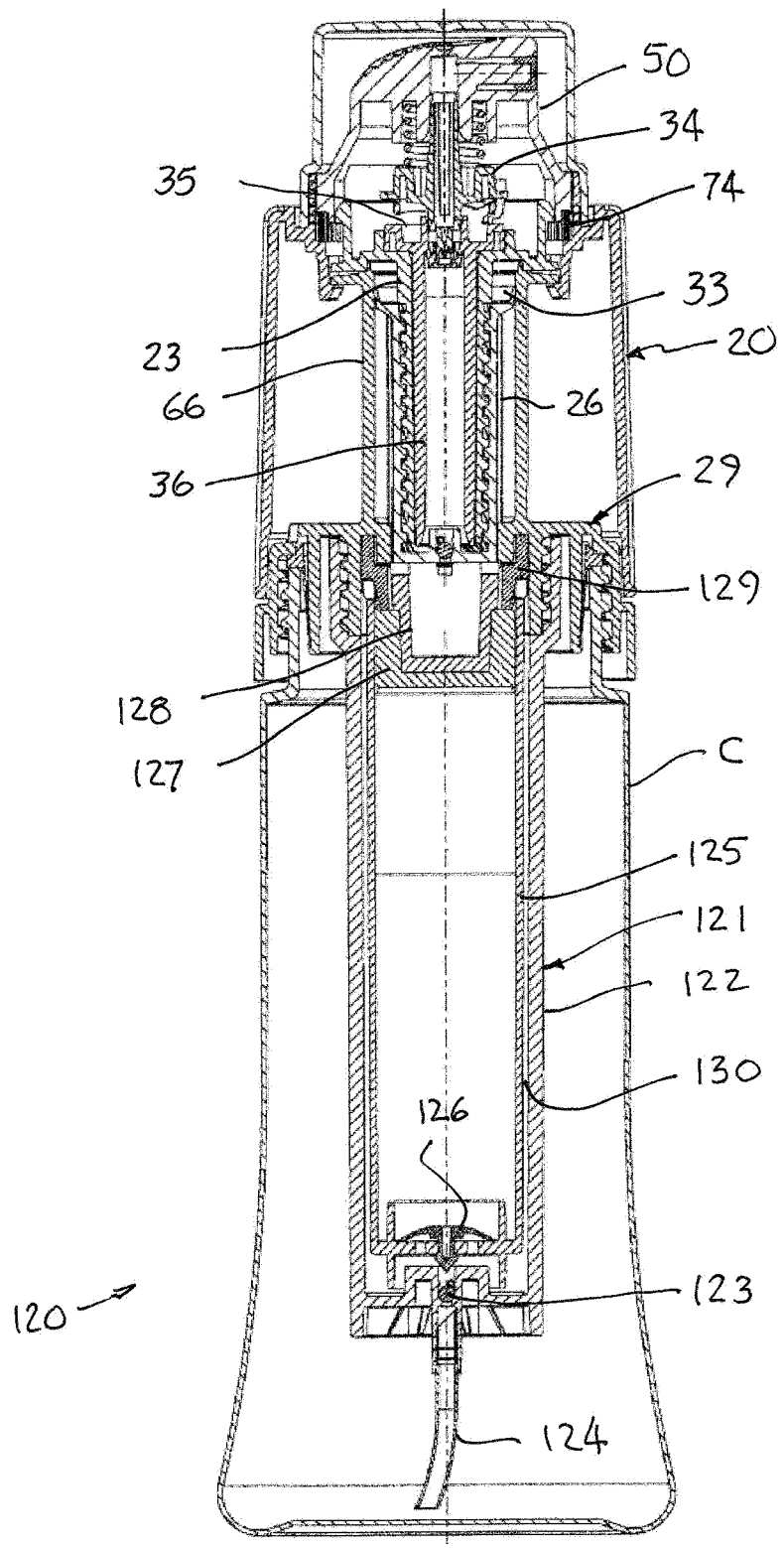
FIG. 19 is a longitudinal sectional view of a second preferred form of the invention that uses the actuating assembly of FIGS. 2-17, but wherein the energy storage means comprises a pneumatic pressure mechanism.
Figures 20, 20A, 20B:
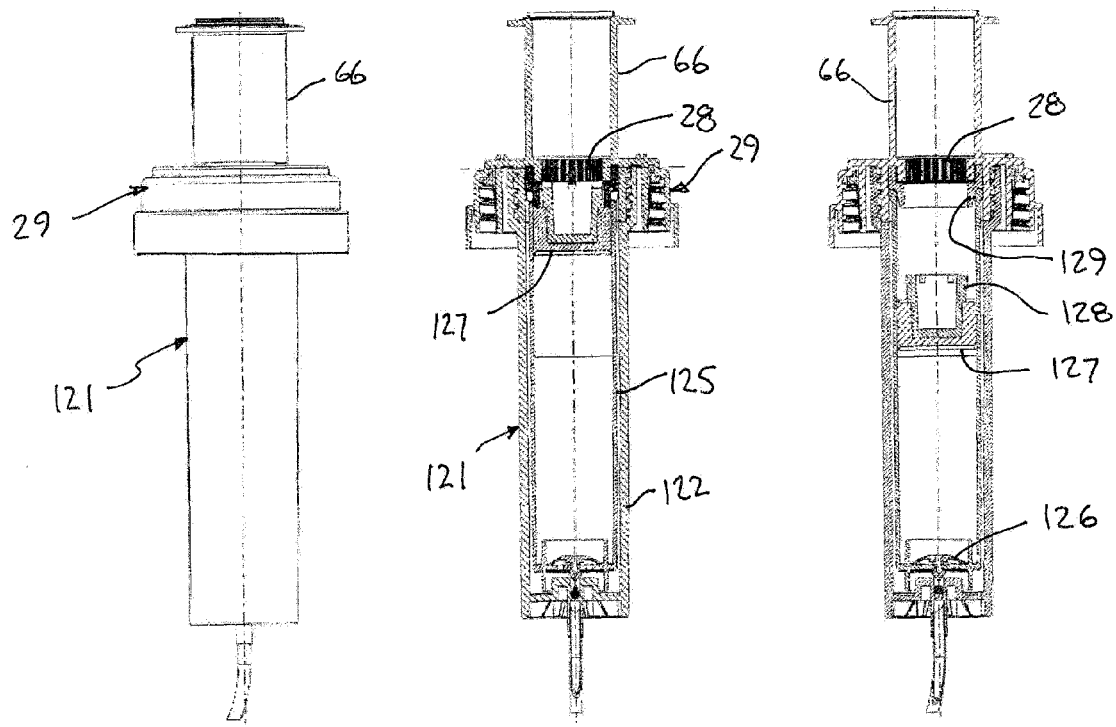
FIG. 20 is a side view in elevation of the pneumatic pressure mechanism of FIG. 19.
FIG. 20A is a longitudinal sectional view of the pneumatic pressure mechanism of FIG. 20, with cap cylinder and dip tube assembled thereto and showing the mechanism in its at rest position.
FIG. 20B is a longitudinal sectional view of the pneumatic pressure mechanism of FIG. 20, showing the mechanism in the primed or loaded position with the plunger positioned in the compressed state.
Figures 21, 21A, 21B, 21C, 21D, 21E:
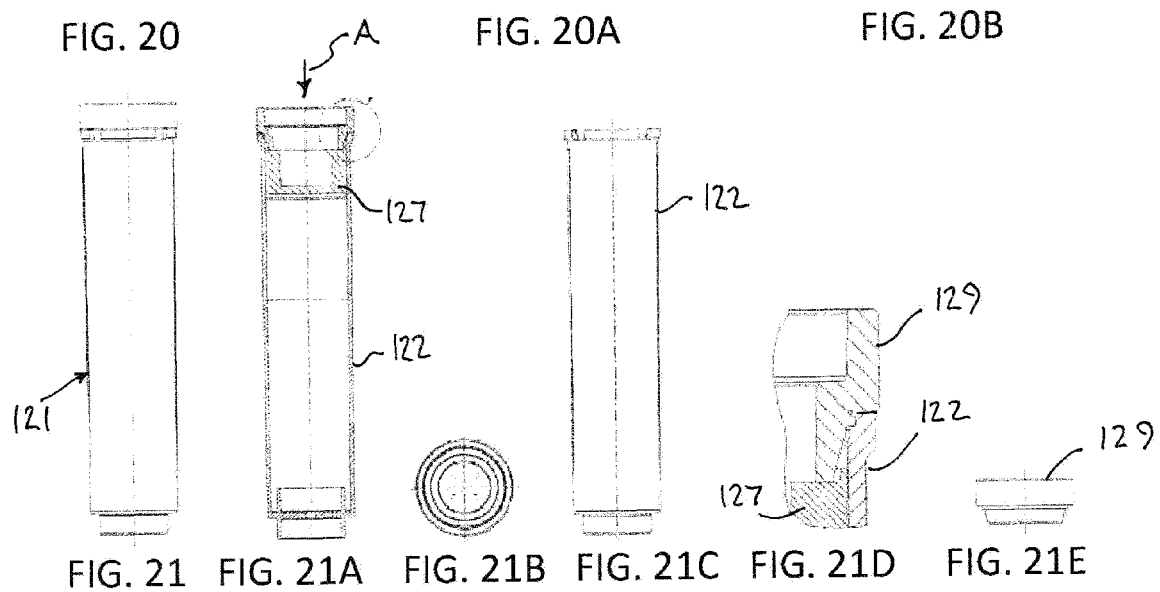
FIG. 21 is a side view in elevation of a first form of pressure vessel as used in the pneumatic mechanism of FIG. 19, shown with the components of the pressure vessel sonically welded together with the plunger in place.
FIG. 21A is a longitudinal sectional view of the pressure vessel of FIG. 21.
FIG. 21B is an end view of the pressure vessel of FIG. 21A, looking in the direction of the arrow A.
FIG. 21C is a side view in elevation of the housing for the pneumatic power chamber of the pressure vessel of FIG. 21, shown prior to assembly thereto of the plunger and upper fitment.
FIG. 21D is a greatly enlarged fragmentary sectional view of the circled area in FIG. 21A, showing the upper fitment welded to the bottom portion of the pressure vessel.
FIG. 21E is a side view in elevation of the upper fitment used in the pressure vessel of FIGS. 21 and 21A.
Figure 22:
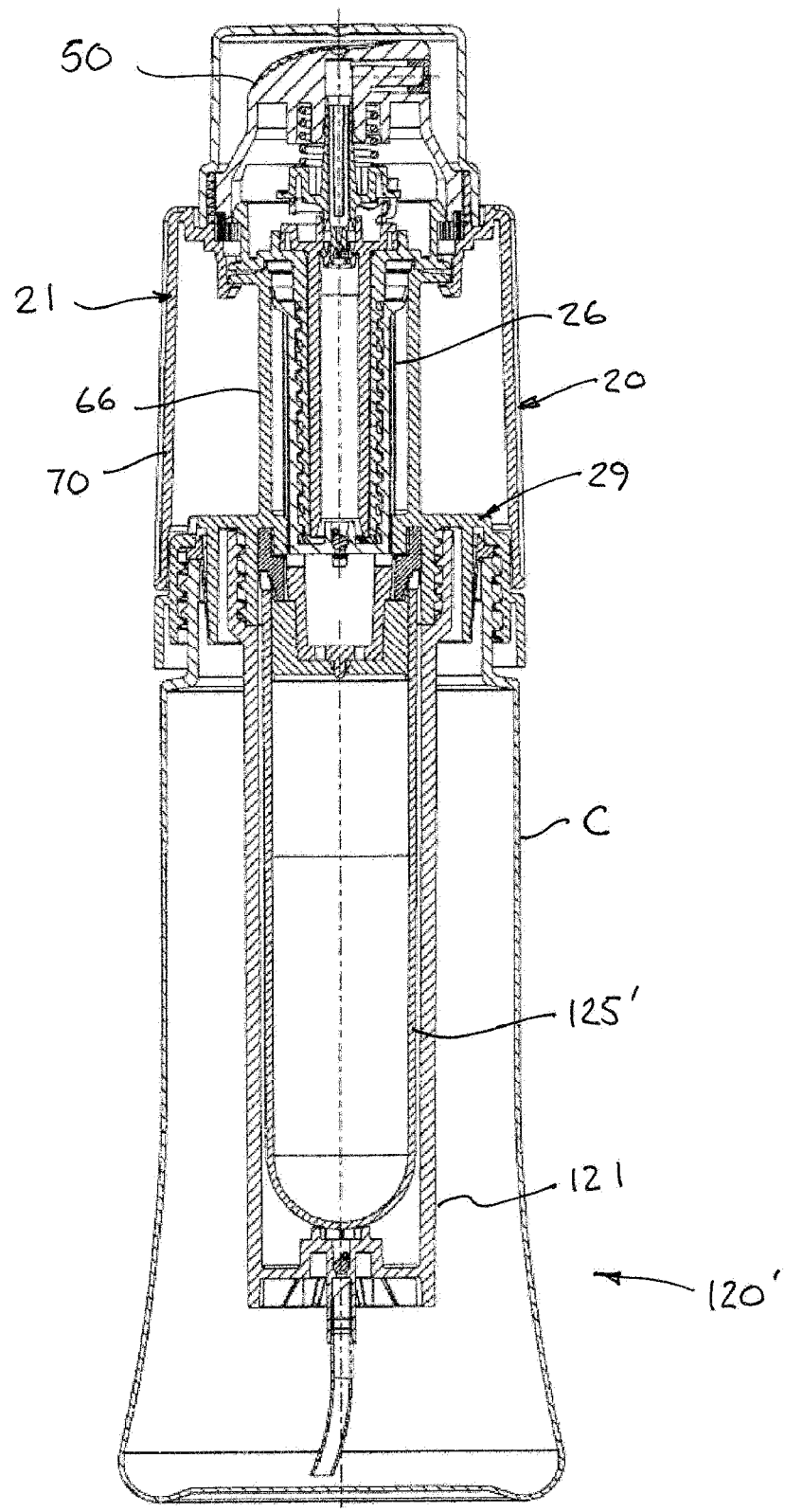
FIG. 22 is a longitudinal sectional view of a third preferred embodiment of dispenser according to the invention, shown in its at-rest state, wherein the same actuating assembly is used as in the previous embodiments but the pressure vessel of the pneumatic energy storage means is a pre-form.
Figure 22A:
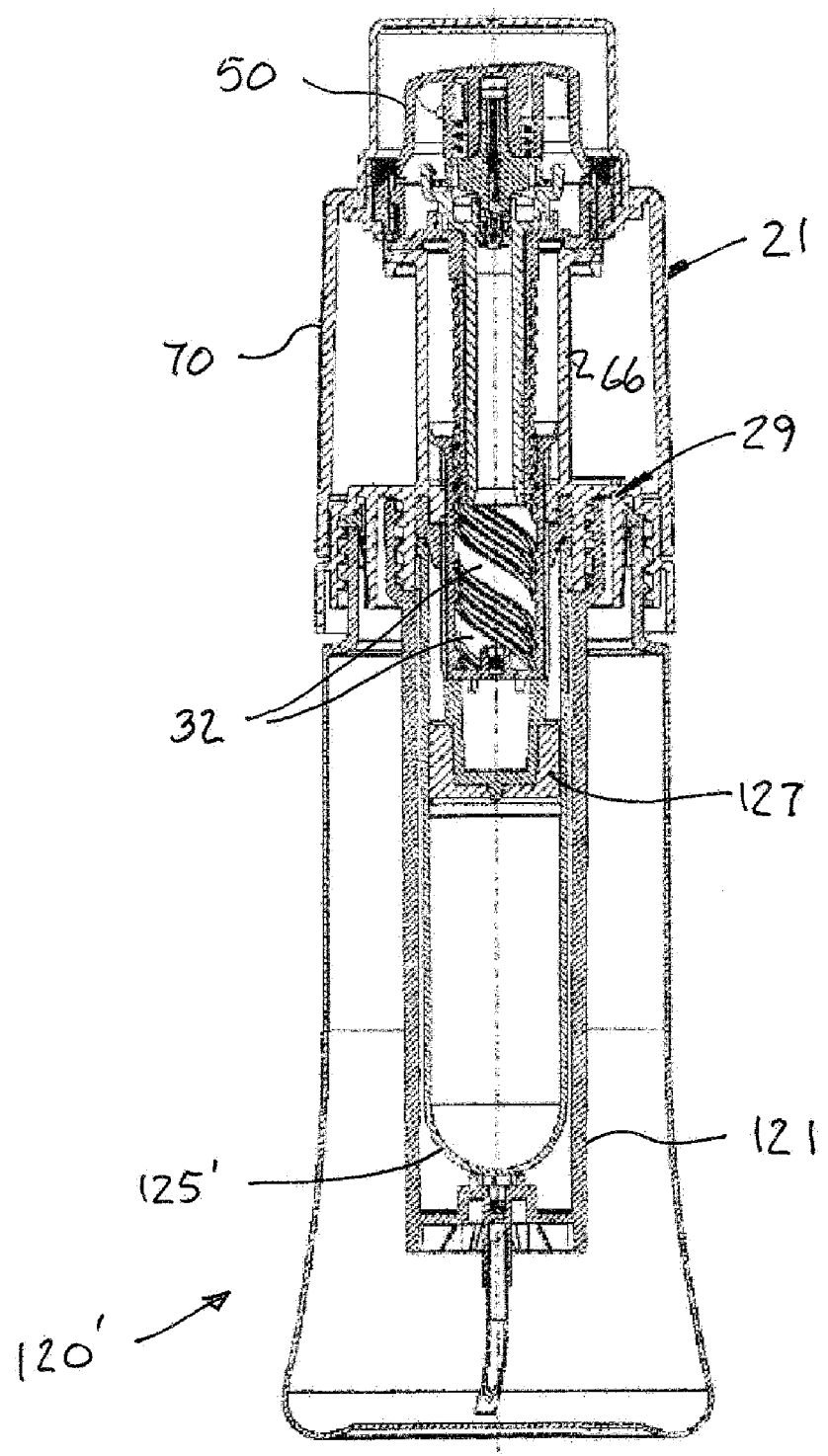
FIG. 22A is a longitudinal sectional view of the dispenser of FIG. 22, shown primed and loaded for dispensing with the plunger in the compressed state.

An alternate embodiment is shown at 120 in FIGS. 19-21E and 24. In this embodiment the spring-powered energy storage means of the previous embodiment is replaced with a pneumatic pressure mechanism 121, but the pump mechanism 20 remains the same as in the previous embodiment. The pneumatic pressure mechanism comprises a pressure vessel housing 122 that has an upper end threaded to the cap cylinder 29 in the same way that the spring housing in the previous embodiment is attached to the cap cylinder. The bottom end of the housing 122 contains a one-way ball check valve 123 that permits flow into the housing but prevents reverse flow. A dip tube 124 is connected to the housing 122 to convey product to the check valve 123 from the container C. A pressure vessel 125 is supported concentrically within the housing 122 and has an umbrella style one-way valve 126 in its lower end to permit flow of into the pressure vessel but prevent reverse flow therefrom. A generally cup-shaped plunger 127 is reciprocal in the pressure vessel, and in the at-rest position shown in FIG. 19 is disposed at the upper end of the pressure vessel. A complementally shaped plunger insert 128 is attached in the cup-shaped plunger and is reciprocal therewith. A uniquely shaped pressure vessel seal 129 is fitted to the underside of the cap cylinder to affect a seal with the plunger when the plunger is in its at-rest position.

Rotation of the actuating collar 21 causes the piston 26 to move downwardly as in the previous embodiment, but instead of compressing a spring, the piston compresses a gaseous material in the pressure vessel 125. This movement of the piston also draws product up through ball check valve 123 and into the annular space 130 between the pressure vessel housing 122 and pressure vessel 125. When the plunger 127 is moved downwardly from its at-rest position by the piston 26 it unseats from the seal 129, permitting the product to flow from the annular space 130 and into the pump chamber 33 just as before. When the actuator is depressed to open the stem valve, the compressed gas in the pressure vessel forces the plunger back up against the piston, moving it back up to pressurize product in the chamber 33 so that it can be dispensed when the actuator is depressed.

A variation of the FIG. 19 embodiment is indicated generally at 120' in FIGS. 22, 22A, 23-23B and 24. This embodiment is constructed and functions identically to the FIG. 19 embodiment except that the pressure vessel 125' is a pre-form and has a differently shaped lower end, devoid of the umbrella valve.

Another variation of the pressure vessel is shown at 125" in FIGS. 25 and 25A. This pressure vessel is made in a two-stage process. In the first stage, the vessel is molded with the profile as indicated in full lines, and in the second stage it is blown out to the profile shown in broken lines. In all other respects this form of the invention is identical to that form shown in FIGS. 19 and 22.

Figures 26, 26A:
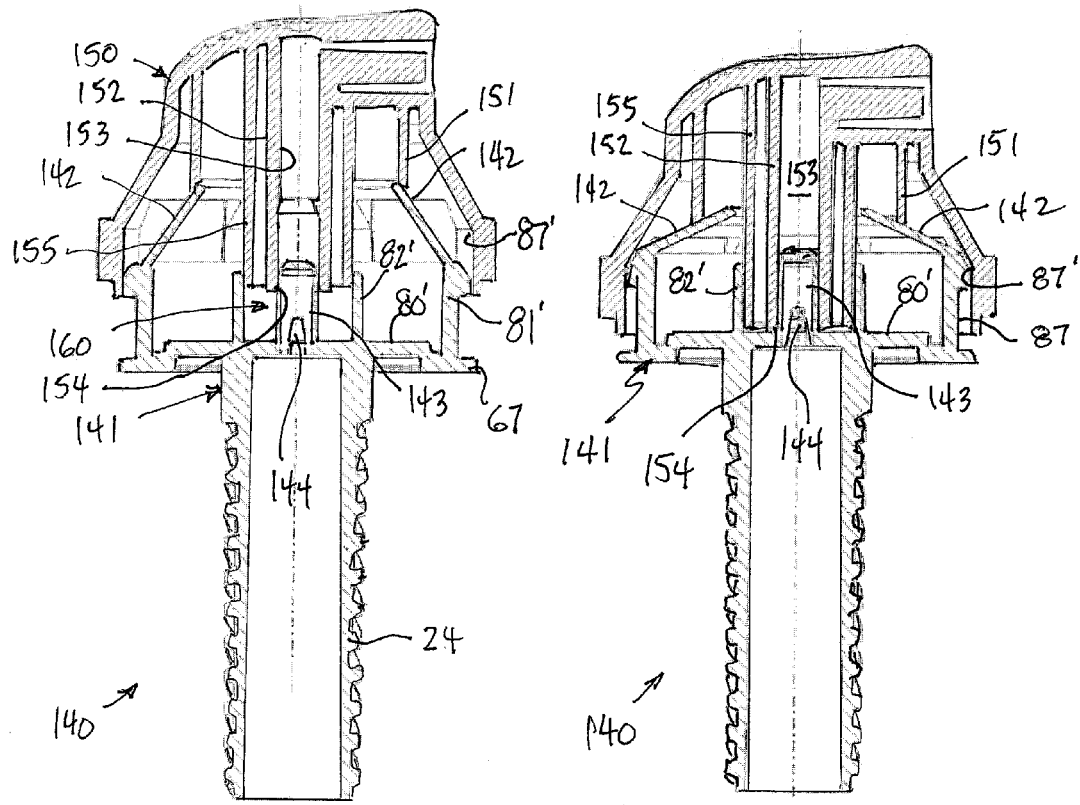
FIG. 26 is a longitudinal sectional view of a modified actuator, drive gear and spring valve retainer fitment for use in the mechanisms of FIGS. 2, 19 and 22, shown in the rest position and with the MBU omitted.
FIG. 26A is a longitudinal sectional view of the modified actuator, drive gear and spring valve retainer of FIG. 26, shown in the depressed, open position for dispensing product.
Figure 26B:
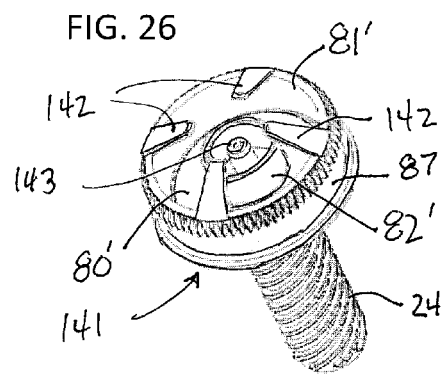
FIGS. 26B and 26C are top isometric views of the modified drive gear and spring valve retainer of FIG. 26.
Figure 26C:
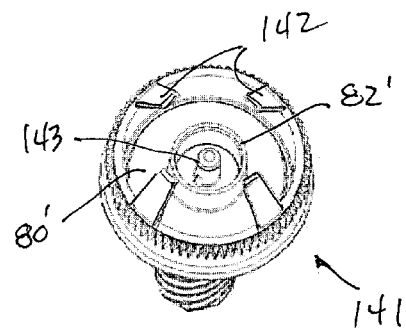
Figure 29A:
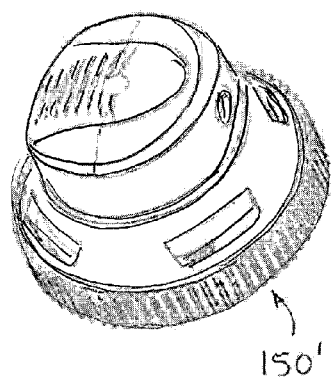
FIG. 29A is a top isometric view of the actuator as used in the mechanism of FIG. 27.
Figure 29B:
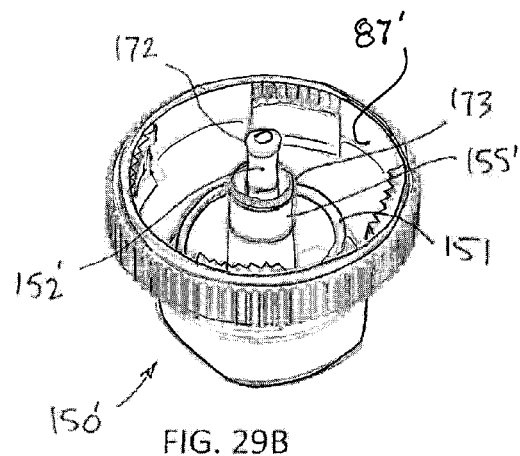
FIG. 29B is a bottom isometric view of the actuator of FIG. 29A.

A modified actuator assembly is indicated generally at 140 in FIGS. 26-26C. Parts corresponding to those in the earlier embodiments are indicated by like reference characters or like reference characters primed. This form of the invention is simplified relative to the previous embodiments in that the stem valve, stem valve retainer and actuator spring coil of the previous embodiments are omitted. In their place, a modified drive screw 141, modified actuator 150 and modified discharge valve 160 are provided. All other parts, not shown in these figures for purpose of simplicity of illustration, are the same as in the previous embodiments.

The drive screw 141 is constructed and functions generally the same as the earlier version 23, except that a plurality of spring fingers 142 are formed on top of the outer wall 81', extending inwardly and upwardly therefrom at an angle. A seal pedestal 143 extends upwardly from the center of wall 80', and a feed opening 144 is formed through the side of the pedestal at the bottom end thereof just above the wall 80'. An inner cylindrical wall 82', taller than the wall 82 in the previous embodiment, extends upwardly from wall 80' in outwardly spaced relation to the pedestal.

The actuator 150 has an outer depending cylindrical wall 151 in a position to engage the inner ends of the spring fingers 142, an inner depending cylindrical wall 152 with an inner bore 153 and a sliding seal 154 on its lower end adapted to affect a sliding seal with the outer surface of the pedestal, and an intermediate depending cylindrical wall 155 that has a sliding seal at its lower end in the wall 82' to seal wall 155 to wall 82' and help stabilize and guide the actuator during its movement.

The discharge valve 160 comprises the seal pedestal 143, feed opening 144, and wall 152 with its seal 154 and inner bore 153. Thus, when the actuator is depressed as depicted in FIG. 26A, the seal 154 on wall 152 moves below the feed opening 144 so that flow of product is enabled through the feed opening and upwardly between the pedestal outer surface and wall 152 inner surface and through the bore 153 to the outlet. Depression of the actuator also flexes the spring fingers 142 downwardly, and when the actuator is released, the spring fingers function to return it to its at-rest position as shown in FIG. 26.

A variation of the FIG. 26 embodiment is shown at 170 in FIGS. 27-29B. This form of the invention differs from the FIG. 26 embodiment in that inner wall 152' in the actuator 150' extends at its lower end beyond the lower end of intermediate wall 155' and into an upstanding inner cylindrical wall 171 in the center of wall 80" on the drive screw 141'. A seal 172 on the lower end of wall 152' affects a sliding seal between wall 152' and wall 171. The lower end of intermediate wall 155' extends into intermediate wall 82" on the drive screw, and a seal 173 on its lower end affects a sliding seal between walls 82" and 155'. As long as the actuator is in its at-rest position shown in FIG. 27, flow through the actuator is blocked. When the actuator is depressed and the seal 172 on the end of wall 152' moves past the lower end of wall 171, flow is enabled between the walls 152' and 171 into an annular outlet chamber 174 defined between walls 152' and 155'.

Figure 30A:
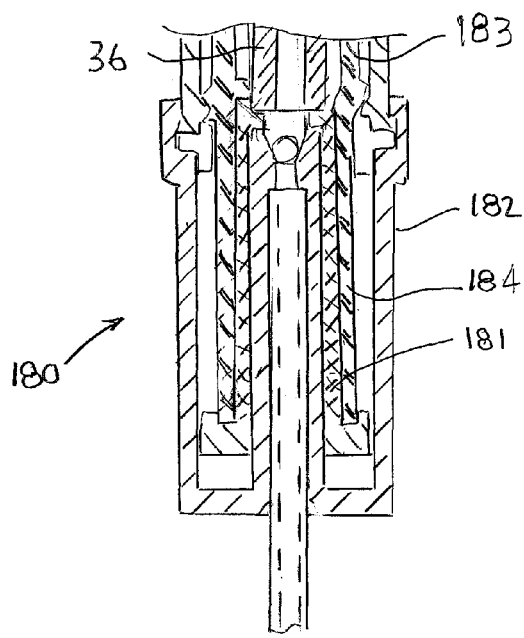
FIG. 30A is a fragmentary longitudinal sectional view of an alternate energy storage means that comprises an elastic mechanism such as described in copending application Ser. No. 11/702,734, shown in its at-rest condition.
Figure 30B:
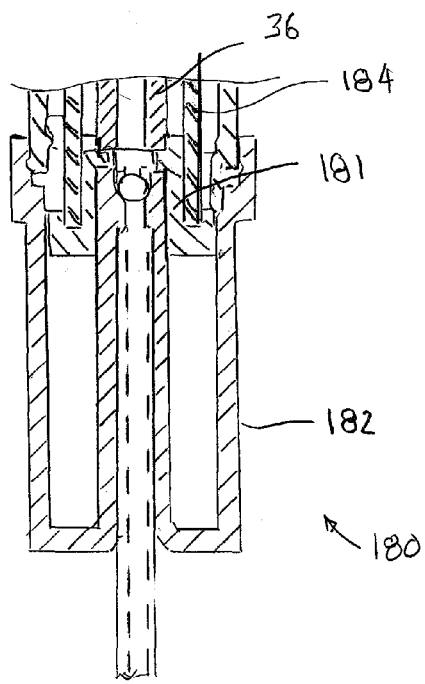
FIG. 30B is a fragmentary longitudinal sectional view of the elastic mechanism of FIG. 30A, shown in its stretched position to store energy.

FIGS. 30A and 30B show a suitable elastic mechanism 180 that could be used in lieu of the spring mechanism or pneumatic pressure mechanism previously described. The elastic mechanism essentially comprises an elastic member 181 movable in a housing 182 that is stretched or elongated by downward movement of a modified piston 183 that has an elongate tail piece 184 connected with the elastic member to stretch it when the piston is moved downwardly by rotation of the actuating collar (not shown in these Figures). The elastic member is shown in its at-rest position in FIG. 30A and in its stretched position in FIG. 30B.

The common pump mechanism used in all embodiments of the invention requires only one turn of the actuating collar, which can be either left or right in design. Turning of the actuating collar causes the piston to move downwardly in the pump cylinder to draw product into the pump chamber or reservoir above the piston and to store energy in the energy storage means. Any one of several different types of energy storage means can be adapted to the common pump mechanism, including a spring mechanism, a pneumatic pressure mechanism, or an elastic mechanism. Each would produce the same results, but by being able to employ different energy storage means certain functional advantages can be obtained. For instance, a different energy storage means could be selected depending upon the range of pressure and force desired or needed to suit various viscosities of product.

With the pneumatic vessel, the initial at-rest pressure can easily be varied to suit particular requirements. With the spring loaded device, a new spring must be supplied to change the biasing force. Corresponding changes to the cylinder bore and piston diameter could be made. A suitable elastic means is described in applicant's copending patent application Ser. No. 11/702,734 filed Feb. 6, 2007.

As can be seen, there is a lot of flexibility provided by the dispensing system of the invention without having to make a whole new system for a given range of products. Also, the force mechanism may be employed with conventional mechanically operated pumps or triggers, lowering overall costs and eliminating the need to construct completely new systems. Although venting is required with the embodiments presented, airless systems may be employed. As can be understood, the present invention provides a convenience comparable to conventional aerosol systems. With the invention there is no need to repeatedly pump an actuator and experience finger fatigue just to get short spurts of product. The embodiments described herein provide a duration spray and a convenience not available to date at an affordable price.

Since numerous modifications and combinations of the above embodiments can be arranged as shown and these embodiments will readily occur to those skilled in the art, it is not desired to limit the invention to the exact construction and process shown and described above. Accordingly, resort may be made to all suitable modifications and equivalents that fall within the scope of the invention as defined by the claims that follow. The words "comprise", "comprises", "comprising", "include(s)", and "including" when used in this specification and in the following claims are intended to specify the presence of stated features or steps, but they do not preclude the presence or addition of one or more other features, steps or groups thereof.

What is claimed is:

1. A power assembly for attachment to a container of product to obtain duration discharge of the product from the container, said power assembly comprising:
   a pump mechanism having a pump cylinder and a piston reciprocal therein, said pump cylinder and piston defining a pump chamber;
   a normally closed discharge valve connected with the pump chamber to prevent discharge of product from the pump chamber when the valve is closed and operable to permit discharge of product from the chamber when the valve is open;
   an actuator connected with the discharge valve to move it to open position;
   drive means connected with said piston for reciprocating the piston in a first direction from an at-rest position to draw product from the container and into the pump chamber, said drive means including a rotatable actuating collar, said actuator, and a drive screw, said drive screw having drive screw gear teeth thereon and said actuator having first gear teeth connected with said rotatable actuating collar and second gear teeth connected with the gear teeth on said drive screw, wherein rotation of said actuating collar causes rotation of said actuator which causes rotation of said drive screw to reciprocate said piston in said first direction when the actuating collar is rotated; and
   an energy storage means connected with the pump mechanism for storing energy when the piston is moved in said first direction, said energy storage means exerting pressure on the piston to move it in a second direction to pressurize product in the pump chamber.

2. A power assembly as claimed in claim 1, wherein:
said pump mechanism and said energy storage means are attached to a cap cylinder; and
said cap cylinder has fastening means to mount it and the attached pump mechanism and energy storage means to a container of product to be dispensed.

3. A power assembly as claimed in claim 2, wherein:
said pump mechanism and said energy storage means are independently attached to said cap cylinder on opposite sides thereof, said pump mechanism and said energy storage means being constructed so that different energy storage means can be attached to said cap cylinder for use with said pump mechanism.

4. A power assembly as claimed in claim 3, wherein:
said energy storage means comprises a coil spring in a spring housing attached to said cap cylinder in coaxial alignment with said pump cylinder and piston; and
said piston is movable through said cap cylinder into said spring housing to compress said spring when the piston is reciprocated in its said first direction.

5. A power assembly as claimed in claim 3, wherein:
said energy storage means comprises a pneumatic pressure mechanism, said pneumatic pressure mechanism comprising an elongate pressure vessel housing attached to said cap cylinder in coaxial alignment with said pump cylinder and piston, and a pressure vessel mounted concentrically within said pressure vessel housing, said pressure vessel containing a gas under pressure; and
said piston is movable through said cap cylinder into said pressure vessel to compress said gas when the piston is reciprocated in its said first direction.

6. A power assembly as claimed in claim 3, wherein:
said energy storage means comprises an elastic mechanism, said elastic mechanism comprising an elongate housing connected in coaxial alignment with said pump cylinder and piston, and an elastic member disposed concentrically within said housing with an upper end thereof fixed to an upper end of said housing and a lower end fixed to an extended end on said piston; and
said extended end on said piston is movable into said housing to stretch said elastic member when the piston is reciprocated in its said first direction.

7. A power assembly as claimed in claim 1, wherein:
an escapement mechanism is connected between said actuating collar and said piston to disengage said piston from said actuating collar when said actuator is operated to open said discharge valve, whereby said actuating collar does not rotate upon movement of said piston in said second direction back to its at-rest position to ready it for another dispensing cycle.

8. A power assembly as claimed in claim 1, wherein:

said piston has an internal bore with helical threads formed therein;

said drive screw has a shaft extending into said internal bore of said piston, said shaft having external helical threads engaged with the internal helical threads in said piston; and said piston is reciprocal through an opening in said cap cylinder, said piston and said opening having interengaged axial splines that prevent rotation of said piston, whereby said interengaged helical threads in said piston and on said drive screw cause said piston to reciprocate upon rotation of said actuating collar and drive screw.

9. A power assembly as claimed in claim 8, wherein:

said pump mechanism and said energy storage means are independently attached to said cap cylinder on opposite sides thereof; and said pump cylinder is formed integrally with said cap cylinder and extends upwardly therefrom.

10. A power assembly as claimed in claim 8, wherein:

an escapement mechanism is connected between said actuating collar and said piston to disengage said piston from said actuating collar when said actuator is operated to open said discharge valve, whereby said actuating collar does not rotate upon movement of said piston in said second direction back to its at-rest position to ready it for another dispensing cycle;

said escapement mechanism comprises a first relief area devoid of gear teeth on said drive screw and a second relief area devoid of gear teeth on said actuator; and said actuator is depressed to open said discharge valve to dispense product from said pump chamber, said second gear teeth on said actuator being in registry with said first relief area, and said drive screw gear teeth on said drive screw being in registry with said second relief area when said actuator is depressed to open said discharge valve, whereby rotation of said drive screw as said piston reciprocates back to its at-rest position is not transmitted to said actuator and actuating collar.

11. A power assembly as claimed in claim 10, wherein:

said drive screw shaft terminates at an upper end thereof in a transverse wall having an outer cylindrical wall extending upwardly from an outer edge thereof;

a plurality of spring fingers are formed on an upper edge of said outer wall and extend angularly inwardly and upwardly therefrom;

an upstanding inner cylindrical wall extends upwardly from said transverse wall in inwardly spaced relation to said outer wall;

a seal pedestal extends upwardly from a center of said transverse wall in inwardly spaced relation to said upstanding inner wall, said seal pedestal having a feed opening in a bottom end thereof; and said actuator has an outer depending cylindrical wall in a position to engage said spring fingers, an intermediate depending cylindrical wall telescopically engaged in said upstanding inner wall and sealed relative thereto, and an inner depending cylindrical wall having a central bore extending longitudinally therethrough and telescopically received at a lower end thereof over said seal pedestal, said inner depending wall having a seal on said lower end that normally blocks flow from said feed opening and into said central bore but moves past said feed opening when the actuator is depressed to enable flow from said feed opening into said central bore.

12. A power assembly as claimed in claim 10, wherein:

said drive screw shaft terminates at an upper end thereof in a transverse wall having an outer cylindrical wall extending upwardly from an outer edge thereof;

a plurality of spring fingers are formed on an upper edge of said outer wall and extend angularly inwardly and upwardly therefrom;

an upstanding intermediate cylindrical wall extends upwardly from said transverse wall in inwardly spaced relation to said outer wall;

an upstanding inner cylindrical wall extends upwardly from a center of said transverse wall in inwardly spaced relation to said upstanding intermediate wall; and said actuator has an outer depending cylindrical wall in a position to engage said spring fingers, an intermediate depending cylindrical wall telescopically engaged in said upstanding intermediate wall and sealed relative thereto, and an inner depending cylindrical wall spaced from said intermediate wall and defining an annular outlet chamber therebetween, said inner depending wall having an extended lower end telescopically received in said upstanding inner cylindrical wall, said inner depending wall having a seal on said lower end that normally blocks flow from said feed opening and into said annular outlet chamber but moves past a lower end of said upstanding inner wall to enable flow between depending inner wall and said upstanding inner wall and into said outlet chamber when the actuator is depressed.

13. A power assembly as claimed in claim 10, wherein:

said discharge valve comprises a stem valve retainer carried by said drive screw, said stem valve retainer having a valve seat thereon;

a stem valve reciprocally mounted to said stem valve retainer for movement into and out of closing relationship with said valve seat; and said actuator is connected to said stem valve to reciprocate it away from said valve seat.

14. A power assembly as claimed in claim 13, wherein:

said actuator has limited axial movement before it will open said stem valve when it is depressed to open the stem valve, said limited axial movement enabling said second gear teeth on said actuator to come into registry with said first relief area and said drive screw gear teeth on said drive screw to come into registry with said second relief area before said stem valve is opened.

15. A power assembly as claimed in claim 14, wherein:

said energy storage means is a spring mechanism comprising a coil spring in a spring housing attached to said cap cylinder in coaxial alignment with said pump cylinder and piston; and said piston is movable through said cap cylinder into said spring housing to compress said spring when the piston is reciprocated in its said first direction.

16. A power assembly as claimed in claim 15, wherein:

said pump mechanism and said energy storage means are independently attached to said cap cylinder on opposite sides thereof, said cap cylinder, said pump mechanism and said energy storage means being constructed so that different energy storage means can be attached to said cap cylinder for use with said pump mechanism.

17. A power assembly as claimed in claim 14, wherein:

said energy storage means comprises a pneumatic pressure mechanism, said pneumatic pressure mechanism comprising an elongate pressure vessel housing attached to said cap cylinder in coaxial alignment with said pump cylinder and piston, and a pressure vessel mounted concentrically within said pressure vessel housing, said pressure vessel containing a gas under pressure; and said piston is movable through said cap cylinder into said pressure vessel to compress said gas when the piston is reciprocated in its said first direction.

18. A power assembly as claimed in claim 14, wherein:

said energy storage means comprises an elastic mechanism, said elastic mechanism comprising an elongate housing connected in coaxial alignment with said pump cylinder and piston, and an elastic member disposed concentrically within said housing with an upper end thereof fixed to an upper end of said housing and a lower end fixed to an extended end on said piston; and said extended end on said piston is movable into said housing to stretch said elastic member when the piston is reciprocated in its said first direction.

19. A power assembly as claimed in claim 14, wherein:

said cap cylinder has a transverse wall adapted to overlie and close an open top of a container when the cap cylinder is attached to the container;

said pump mechanism and said energy storage means are independently attached to said cap cylinder on opposite sides of said transverse wall;

said pump cylinder is formed integrally with said cap cylinder and extends upwardly therefrom to an open upper end having a radially outwardly directed flange thereon;

said actuating collar is disposed in outwardly spaced concentric relationship to said pump cylinder and has an upper end adjacent said upper end of said pump cylinder and a lower end adjacent an outer margin of said transverse wall of said cap cylinder; and detent means are formed in said upper end of said actuating collar, and said detent means being engaged with said flange on said pump cylinder to hold said actuating collar to said pump cylinder and thus to said cap cylinder.

20. A power assembly as claimed in claim 19, wherein:

said energy storage means is attached to said transverse wall and extends downwardly therefrom.

21. A power assembly as claimed in claim 20, wherein:

said energy storage means is a spring mechanism comprising a coil spring in a spring housing attached to said transverse wall in coaxial alignment with said pump cylinder and piston; and said piston is movable through said transverse wall into said spring housing to compress said spring when the piston is reciprocated in its said first direction.

22. A power assembly as claimed in claim 21, wherein:

said stem valve retainer has an elongate tail piece received concentrically in the shaft of said drive screw, said stem valve retainer having a hollow bore extending longitudinally therethrough and a lower end adjacent a lower end of said piston;

a guide stem extends upwardly in said spring housing from a lower end thereof and in concentric relationship to said spring housing, said guide stem having a central bore extending longitudinally therethrough;

a one-way valve in said lower end of said spring housing for permitting flow therethrough into said central bore but preventing reverse flow therethrough;

a spring follower telescopically engaged on said guide stem and having a hollow bore extending longitudinally therethrough, an upper end of said guide stem having a sliding seal with said bore in said spring follower;

said lower end of said piston extending into engagement with said spring follower to move said spring follower downwardly and compress said spring when said piston is reciprocated in said first direction;

flow channels formed in the helical threads between said piston and said drive screw, establishing fluid communication between said pump chamber and the hollow bore of said stem valve retainer; and a one-way valve in said piston lower end for permitting flow therethrough from the hollow bore of said spring follower and into said bore of said stem valve retainer and through said flow channels into said pump chamber but preventing reverse flow therethrough.

23. A power assembly for attachment to a container of product to obtain duration discharge of the product from the container, said power assembly comprising:

a pump mechanism having a pump cylinder and a piston reciprocal therein, said pump cylinder and piston defining a pump chamber;

a normally closed discharge valve connected with the pump chamber to prevent discharge of product from the pump chamber when the valve is closed and operable to permit discharge of product from the chamber when the valve is open;

an actuator connected with the discharge valve to move it to an open position when said actuator is depressed;

drive means including a rotatable actuating collar connected to cause said piston to move in a first direction from an at-rest position to draw product from the container and into the pump chamber when said actuating collar is rotated;

means for moving said piston in a second direction to pressurize product in the pump chamber and discharge it from the pump chamber when the discharge valve is opened; and an escapement mechanism connected in said drive means between said actuating collar and said piston, and operable independent of a rotated position of said actuating collar to disengage said drive means to prevent rotation of said actuating collar upon movement of said piston in said second direction back to its at-rest position to ready it for another dispensing cycle, wherein said actuator is connected to operate said escapement mechanism to disengage said drive means when said actuator is depressed to open said discharge valve.

24. A power assembly for attachment to a container of product to obtain duration discharge of the product from the container, said power assembly comprising:

a pump mechanism having a pump cylinder and a piston reciprocal therein, said pump cylinder and piston defining a pump chamber;

a normally closed discharge valve connected with the pump chamber to prevent discharge of product from the pump chamber when the valve is closed and operable to permit discharge of product from the chamber when the valve is open;

an actuator connected with the discharge valve to move it to an open position when said actuator is depressed;

drive means connected with said piston for reciprocating the piston in a first direction from an at-rest position to draw product from the container and into the pump chamber, said drive means including said actuator and a rotatable actuating collar connected to rotate said actuator, said actuator being connected to cause said piston to reciprocate in said first direction when the actuating collar and actuator are rotated; and an escapement mechanism connected in said drive means between said actuating collar and said piston, and operable independent of a rotated position of said actuating collar to disengage said drive means to prevent rotation of said actuating collar upon movement of said piston in a second direction back to an at-rest position to ready it for another dispensing cycle, wherein said escapement mechanism is operated by said actuator to disengage said drive means when said actuator is depressed to open said discharge valve.

25. A power assembly as claimed in claim 24, wherein: said drive means includes a drive screw, said drive screw having drive screw gear teeth thereon and said actuator having first gear teeth connected with said rotatable actuating collar and second gear teeth connected with the gear teeth on said drive screw, wherein rotation of said actuating collar causes rotation of said actuator which causes rotation of said drive screw.

26. A power assembly as claimed in claim 25, wherein:
said escapement mechanism comprises a first relief area devoid of gear teeth on said drive screw and a second relief area devoid of gear teeth on said actuator; and
said actuator is depressed to open said discharge valve to dispense product from said pump chamber, said second gear teeth on said actuator being in registry with said first relief area, and said drive screw gear teeth on said drive screw being in registry with said second relief area when said actuator is depressed to open said discharge valve, whereby rotation of said drive screw as said piston reciprocates back to its at-rest position is not transmitted to said actuator and actuating collar.

* * * * *